(12) United States Patent
Han et al.

(10) Patent No.: US 12,426,751 B2
(45) Date of Patent: Sep. 30, 2025

(54) ROBOT CLEANER

(71) Applicant: SAMSUNG ELECTRONICS CO., LTD., Suwon-si (KR)

(72) Inventors: Seungil Han, Suwon-si (KR); Youngho Ko, Suwon-si (KR); Sinae Kim, Suwon-si (KR); Kihwan Kwon, Suwon-si (KR); Shin Kim, Suwon-si (KR); Jinhee Kim, Suwon-si (KR); Jaeyoul Jeong, Suwon-si (KR); Hyunsoo Jung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 360 days.

(21) Appl. No.: 18/134,786

(22) Filed: Apr. 14, 2023

(65) Prior Publication Data

US 2023/0248194 A1    Aug. 10, 2023

Related U.S. Application Data

(63) Continuation of application No. PCT/KR2021/010919, filed on Aug. 18, 2021.

(30) Foreign Application Priority Data

Oct. 15, 2020 (KR) .................. 10-2020-0133485

(51) Int. Cl.
  *A47L 9/00* (2006.01)
  *A47L 9/28* (2006.01)
  *A47L 11/40* (2006.01)

(52) U.S. Cl.
  CPC .......... *A47L 9/009* (2013.01); *A47L 9/2852* (2013.01); *A47L 11/4072* (2013.01); *A47L 2201/04* (2013.01); *B60B 2200/49* (2013.01)

(58) Field of Classification Search
  CPC ... A47L 9/00; A47L 9/009; A47L 9/28; A47L 9/2836; A47L 9/2852; A47L 11/40; A47L 11/4072; A47L 2201/04; B60B 2200/49
  See application file for complete search history.

(56) References Cited

U.S. PATENT DOCUMENTS

| 9,335,767 | B2 | 5/2016 | Jang et al. |
| 2013/0340201 | A1 | 12/2013 | Jang et al. |

(Continued)

FOREIGN PATENT DOCUMENTS

| CN | 108338745 A | 7/2018 |
| CN | 109008831 A | 12/2018 |

(Continued)

OTHER PUBLICATIONS

Office Action issued by the European Patent Office on Jul. 17, 2024 for European Patent Application No. 21 880 295.7.

(Continued)

*Primary Examiner* — C. A. Rivera
(74) *Attorney, Agent, or Firm* — STAAS & HALSEY LLP

(57) ABSTRACT

A robot cleaner including: a cleaner body; a motor, configured to be fixed to the cleaner body, and provide a rotational force; a gear unit configured to transmit the rotational force of the motor; a wheel configured to rotate and drive the cleaner body according to the rotational force of the motor transmitted by the gear unit to the wheel; and a suspension including a first end portion pivotally supportable on a pivot of the cleaner body, which is spaced apart from a rotary shaft of the motor, and a second end portion to extend from the first end portion and support the wheel to move up and down with respect to the cleaner body as the second end portion moves in a first direction and a second direction around the pivot of the cleaner body.

14 Claims, 23 Drawing Sheets

(56) References Cited

U.S. PATENT DOCUMENTS

| | | | | |
|---|---|---|---|---|
| 2014/0238756 A1* | 8/2014 | Dyson | ................. | B60L 15/2036 |
| | | | | 180/9.64 |
| 2015/0150429 A1* | 6/2015 | Yoo | .................... | A47L 11/4011 |
| | | | | 173/4 |
| 2019/0059674 A1 | 2/2019 | Koura | | |
| 2019/0133401 A1 | 5/2019 | Zita et al. | | |
| 2019/0357743 A1 | 11/2019 | Koura et al. | | |
| 2020/0395815 A1 | 12/2020 | Lee et al. | | |

FOREIGN PATENT DOCUMENTS

| | | |
|---|---|---|
| JP | 2016-2198 | 1/2016 |
| KR | 10-2011-0133902 | 12/2011 |
| KR | 10-2015-0065134 | 6/2015 |
| KR | 10-2018-0068622 | 6/2018 |
| KR | 10-2035138 | 10/2019 |
| KR | 10-2020-0007490 | 1/2020 |
| WO | WO 2014/047557 A1 | 3/2014 |
| WO | WO 2022/030680 A1 | 2/2022 |

OTHER PUBLICATIONS

Office Action dated Jun. 20, 2023 in European Patent Application No. 21880295.7.
International Search Report issued in International Application No. PCT/KR2021/010919 dated Dec. 16, 2021.
Written Opinion issued in International Application No. PCT/KR2021/010919 dated Dec. 16, 2021.
Extended European Search Report dated Oct. 18, 2023 in European Patent Application No. 21880295.7.

* cited by examiner

FIG. 19

| | REFERENCES | $R_x$ (mm) | $L_x$ (mm) | $\alpha_x$ (°) | $\beta_x$ (°) | $F_S$ (kgf) TRAVELING | $F_S$ (kgf) CLIMBING | $F_N$ (kgf) TRAVELING | $F_N$ (kgf) CLIMBING |
|---|---|---|---|---|---|---|---|---|---|
| (A) | ① | $R_1 > R_0$ | $L_0$ | $\alpha_0$ | $\beta_0$ | $F_{S1} < F_{S0}$ | $F_{S1} < F_{S0}$ | $F_{N0}$ | $F_{N1} < F_{N0}$ |
| (A) | ② | $R_2 < R_0$ | $L_0$ | $\alpha_0$ | $\beta_0$ | $F_{S2} > F_{S0}$ | $F_{S2} > F_{S0}$ | $F_{N0}$ | $F_{N2} > F_{N0}$ |
| (A) | ③ | $R_0$ | $L_0$ | $\alpha_3 < \alpha_0$ | $\beta_0$ | $F_{S3} > F_{S0}$ | $F_{S3} > F_{S0}$ | $F_{N0}$ | $F_{N3} > F_{N0}$ |
| (A) | ④ | $R_0$ | $L_0$ | $\alpha_4 > \alpha_0$ | $\beta_0$ | $F_{S4} < F_{S0}$ | $F_{S4} < F_{S0}$ | $F_{N0}$ | $F_{N4} < F_{N0}$ |
| (B) | ⑤ | $R_0$ | $L_5 > L_0$ | $\alpha_0$ | $\beta_0$ | $F_{S0}$ | $F_{S5} > F_{S0}$ | $F_{N0}$ | $F_{N5} > F_{N0}$ |
| (B) | ⑥ | $R_0$ | $L_6 < L_0$ | $\alpha_0$ | $\beta_0$ | $F_{S0}$ | $F_{S6} < F_{S0}$ | $F_{N0}$ | $F_{N6} < F_{N0}$ |
| (B) | ⑦ | $R_0$ | $L_0$ | $\alpha_0$ | $\beta_7 > \beta_0$ | $F_{S0}$ | $F_{S7} > F_{S0}$ | $F_{N0}$ | $F_{N7} > F_{N0}$ |
| (B) | ⑧ | $R_0$ | $L_0$ | $\alpha_0$ | $\beta_8 > \beta_0$ | $F_{S0}$ | $F_{S8} < F_{S0}$ | $F_{N0}$ | $F_{N8} < F_{N0}$ |

FIG. 20

| | $R_x$ (mm) | $\alpha_x$ (°) | $L_x$ (mm) | $\beta_x$ (°) | SPRING FORCE $F_S$ (kgf) | SPRING FORCE $F_N$ (kgf) | RANKING |
|---|---|---|---|---|---|---|---|
| REFERENCE($R_0$) | $R_0$ 30mm | $\alpha_0$ 52° | $L_0$ 80mm | $\beta_0$ 30° | 0.49 | 0.91 | REFERENCE |
| $R_2$ CHANGE | $R_2$ (0.9*$R_0$) 27mm | $\alpha_0$ 52° | $L_0$ 80mm | $\beta_0$ 30° | 0.53 | 0.95 | 2 |
| $\alpha_3$ CHANGE | $R_0$ 30mm | $\alpha_3$ (0.9*$\alpha_0$) 46.8° | $L_0$ 80mm | $\beta_0$ 30° | 0.51 | 0.94 | 3 |
| $L_5$ CHANGE | $R_0$ 30mm | $\alpha_0$ 52° | $L_5$ (1.1*$L_0$) 88mm | $\beta_0$ 30° | 0.57 | 0.98 | 1 |
| $\beta_7$ CHANGE | $R_0$ 30mm | $\alpha_0$ 52° | $L_0$ 80mm | $\beta_7$ (0.9*$\beta_0$) 27° | 0.50 | 0.92 | 4 |

ROBOT CLEANER

CROSS-REFERENCE TO RELATED APPLICATION

This application is a continuation application, under 35 U.S.C. § 111(a), of International Application No. PCT/KR2021/010919, filed on Aug. 18, 2021, in the Korean Intellectual Property Office and is based on and claims priority to Korean Patent Applications No. 10-2020-0133485 filed on Oct. 15, 2020, in the Korean Intellectual Property Office, the disclosures of which are incorporated by reference herein in their entirety.

BACKGROUND

Field

The disclosure relates to a robot cleaner, and more particularly to a robot cleaner improved in a wheel assembly structure.

Description of Related Art

A robot cleaner refers to an apparatus that automatically cleans a cleaning area by sucking dust and the like foreign materials from a floor while autonomously traveling through the cleaning area even without a user's control. Such a robot cleaner detects distances from furniture, office supplies, sill and the like obstacles placed within the cleaning area, and correspondingly maps the cleaning area or controls the operations of a left wheel and a right wheel to avoid or cross the obstacles, thereby performing cleaning.

A conventional robot cleaner includes a pair of wheels, a support frame supporting the wheels at one side and rotatably and elastically supported on a cleaner body at the other side, a driving motor installed in the support frame, and a gear unit provided inside the support frame and transmitting a rotational force of the driving motor to the wheels. The cleaner body may perform cleaning while repeatedly moving up and down with respect to the wheels. As the cleaner body moves up and down, electric wires connected from the cleaner body to the driving motor supported in the support frame also move together, thereby causing a problem of disconnection.

Further, a robot cleaner implemented to have a compact size has a large lifting angle of the cleaner body when climbing an obstacle, and therefore has a problem that it does not cross the obstacle because an error of mistaking a low obstacle as a high obstacle occurs.

In addition, the robot cleaner implemented to have a compact size has a small pivoting angle range of the support frame, and therefore gets stuck due to a wheel lift and decreased in grip.

SUMMARY

According to an embodiment of the disclosure, there is provided a robot cleaner. The robot cleaner includes: a cleaner body; a motor, configured to be fixed to the cleaner body, and provide a rotational force; a gear unit configured to transmit the rotational force of the motor; a wheel configured to rotate and drive the cleaner body according to the rotational force of the motor transmitted by the gear unit to the wheel; and a suspension including a first end portion pivotally supportable on a pivot of the cleaner body, which is spaced apart from a rotary shaft of the motor, and a second end portion to extend from the first end portion and support the wheel to be moveable relative to the cleaner body while the motor is fixed to the cleaner body whereby the wheel moves up with respect to the cleaner body as the second end portion moves in a first direction around the pivot of the cleaner body and the wheel moves down with respect to the cleaner body as the second end portion moves in a second direction around the pivot of the cleaner body.

The motor may be supported on the cleaner body.

The pivot may be provided apart from the rotary shaft of the motor.

The pivot of the cleaner body may be located between the rotary shaft of the motor supported on the cleaner body and a lower end of the cleaner body, and closer to the lower end of the cleaner body than the rotary shaft.

The gear unit may include a first gear unit provided between the rotary shaft of the motor and the pivot of the cleaner body, and a second gear unit provided between the pivot of the cleaner body and a wheel shaft of the wheel.

The first gear unit may include a reduction gear.

The first gear unit may include: a first gear supportable on the rotary shaft of the motor; a second gear supportable on the pivot of the cleaner body; and a third gear supportable on the cleaner body to rotate engaging with the first gear and the second gear.

The third gear may include a third lower gear and a third upper gear which are coaxially and integrally supportable thereon, and the third lower gear may engage with the first gear, and the third upper gear may engage with the second gear.

The second gear unit may include: a fourth gear coaxially and integrally supportable thereon; a fifth gear supportable on the wheel shaft; and a sixth gear, a seventh gear and an eighth gear provided to sequentially engage between the fourth gear and the fifth gear.

The seventh gear may include a seventh lower gear and a seventh upper which are coaxially and integrally supportable thereon, and the eighth gear may include an eighth lower gear and an eighth upper gear which are coaxially and integrally supportable thereon.

The sixth gear may engage with both the fourth gear and the seventh lower gear, the seventh upper gear may engage with the eighth lower gear, and the eighth upper gear may engage with the fifth gear.

The suspension may include a gear case accommodating the second gear unit.

The suspension may include a tension spring comprising opposite ends that are supportable on the suspension and the cleaner body, and elastically stretched and compressed as the pivot turns.

The suspension may include a first hook supporter provided in the first end portion thereof and is configured to hook a first end of the tension spring, and the cleaner body may include a second hook supporter configured to hook a second end of the tension spring.

The cleaner body may include a suspension case to accommodate and cover the suspension, the first hook supporter may pass through and protrude from a first side of the suspension case, and the second hook supporter may be supportable on a second side of the suspension case.

The robot cleaner may further include a lift detector detecting a lift of the wheel with respect to the cleaner body.

The lift detector may be provided within a turning radius of the first hook supporter corresponding to pivoting of the suspension.

The lift detector may include: an actuator to support a magnet and be supportable to turn by the turning of the first hook supporter; and a magnet sensor provided in the cleaner body within a turning path of the actuator.

The first hook supporter may be configured to be able rotate the actuator so that the magnet matches the magnet sensor.

The cleaner body may be configured to have a center of gravity at a front side thereof with respect to a center of the wheel.

BRIEF DESCRIPTION OF THE DRAWINGS

The above and other aspects, features, and advantages of certain embodiments of the present disclosure will be more apparent from the following detailed description, taken in conjunction with the accompanying drawings, in which:

FIG. 19 is a table in which grip varied depending on clamping positions of a suspension is tabulated according to an embodiment of the disclosure.

FIG. 20 is a table in which clamping positions contributing to grip are tabulated according to an embodiment of the disclosure.

DETAILED DESCRIPTION

Below, embodiments of a robot cleaner 1 will be described in detail with reference to the accompanying drawings. In terms of describing the disclosure, details about publicly known functions or elements will be omitted if it is determined that they cloud the gist of the disclosure.

Therefore, an aspect of the disclosure is to provide a robot cleaner increased in a wheel stroke and grip and preventing disconnection of electric wires supplying electric power to a driving motor.

Further, another aspect of the disclosure is to provide a robot cleaner improved in obstacle-climbing performance.

In a robot cleaner according to the disclosure, a driving motor for wheels is fixed to a cleaner body, so that an electric wire for supplying electric power to the driving motor can be prevented from disconnection when the robot cleaner climbs an obstacle or the wheels are displaced.

In a robot cleaner according to the disclosure, a pivot of a suspension is spaced apart from a rotary shaft of a driving motor, thereby increasing grip.

In a robot cleaner according to the disclosure, a two-stage spring structure of a tension spring and a compression spring is employed to satisfy both opposite specifications of carpet traveling and climbing performance.

In a robot cleaner according to the disclosure, fall detection is performed both before climbing an obstacle and while being positioned on the obstacle, thereby improving climbing performance.

In a robot cleaner according to the disclosure, a separate actuator is used to detect a wheel lift, thereby increasing a wheel stroke and improving a problem of getting stuck due to a wheel lift.

Figure 1:
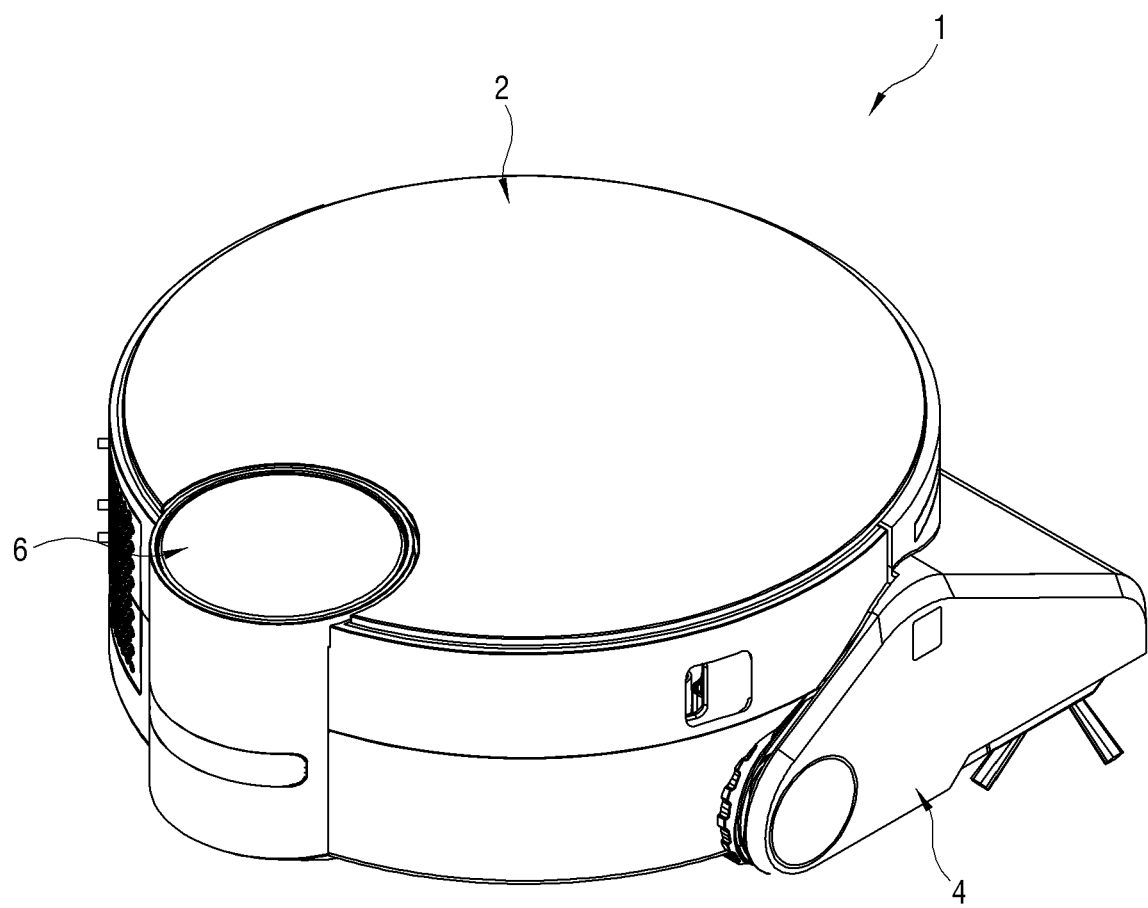
FIG. 1 is a perspective view of a robot cleaner according to an embodiment of the disclosure.
Figure 2:
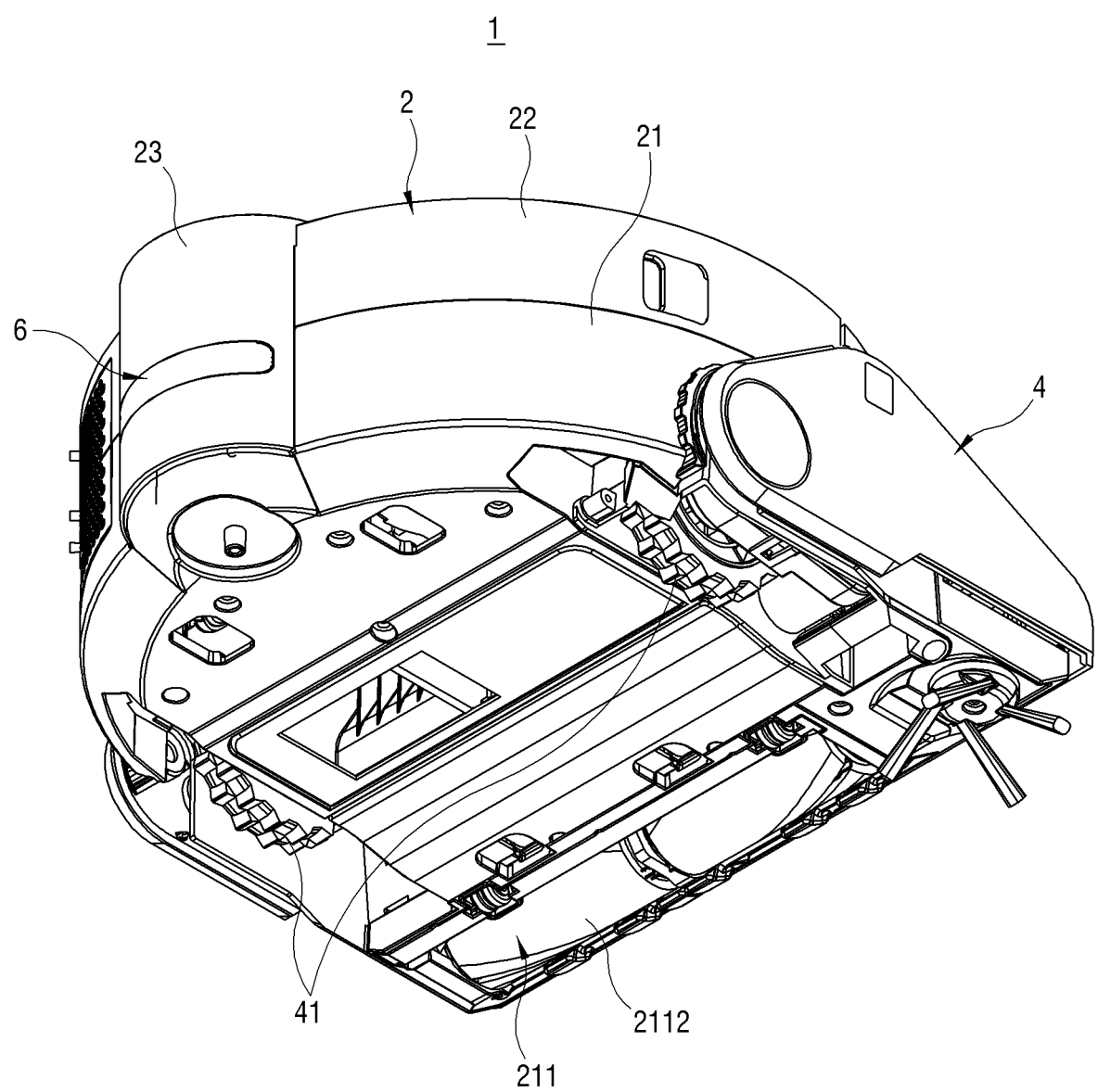
FIG. 2 is a perspective view showing a bottom of the robot cleaner in FIG. 1 according to an embodiment of the disclosure.

FIG. 1 is a perspective view of a robot cleaner according to a first embodiment of the disclosure, and FIG. 2 is a perspective view showing a bottom of the robot cleaner in FIG. 1.

As shown in FIGS. 1 and 2, the robot cleaner 1 according to a first embodiment of the disclosure may include a cleaner body 2 to perform cleaning while traveling through a cleaning area, a pair of wheel assemblies 4 provided at the left and right sides of the cleaner body 2 and making the cleaner body 2 travel, and a sensor unit 6.

M The cleaner body 2 includes a dust sucking body 21 to suck dust from a cleaning area by generating a suction force, an upper cover 22 to cover an upper portion of the dust sucking body 21, and a sensor housing 23 to accommodate the sensor unit 6.

The dust sucking body 21 may include a sucker 211 to suck dust and the like foreign materials while traveling through the cleaning area, a suction motor to generate a suction force for sucking dust from the cleaning area, a filter to filter the sucked dust and the like foreign materials, and a dust bin to contain the filtered foreign materials.

The sucker 211 may suck dust from the cleaning area into the cleaner body 2 by the suction force. The sucker 211 may include a drum brush 2112 to shake off dust from the floor or carpet while rotating.

The pair of wheel assemblies 4 may include wheels 41 to turn so that the cleaner body 2 can move through the cleaning area without slipping.

The sensor unit 6 may be mounted to the sensor housing 23 of the cleaner body 2.

The sensor unit 6 may emit infrared light, laser light or ultrasonic waves to the cleaning area and detect a distance from an obstacle, the position of the obstacle, the height of the obstacle, etc. based on the infrared light or the like reflected from the obstacle. The sensor unit 6 may include a light source that emits light, and a light receiver that receives the emitted light after being reflected from an obstacle. The light source may include a light emitter that emits infrared or visible light, for example, an infrared or visible light emitting diode (LED), or a laser emitter. The light receiver refers to a set of unit pixels arranged in a matrix form, and each unit pixel may be implemented by various light receiving elements such as cadmium sulfide (CdS) cell, a photodiode, and a phototransistor.

Figure 3:
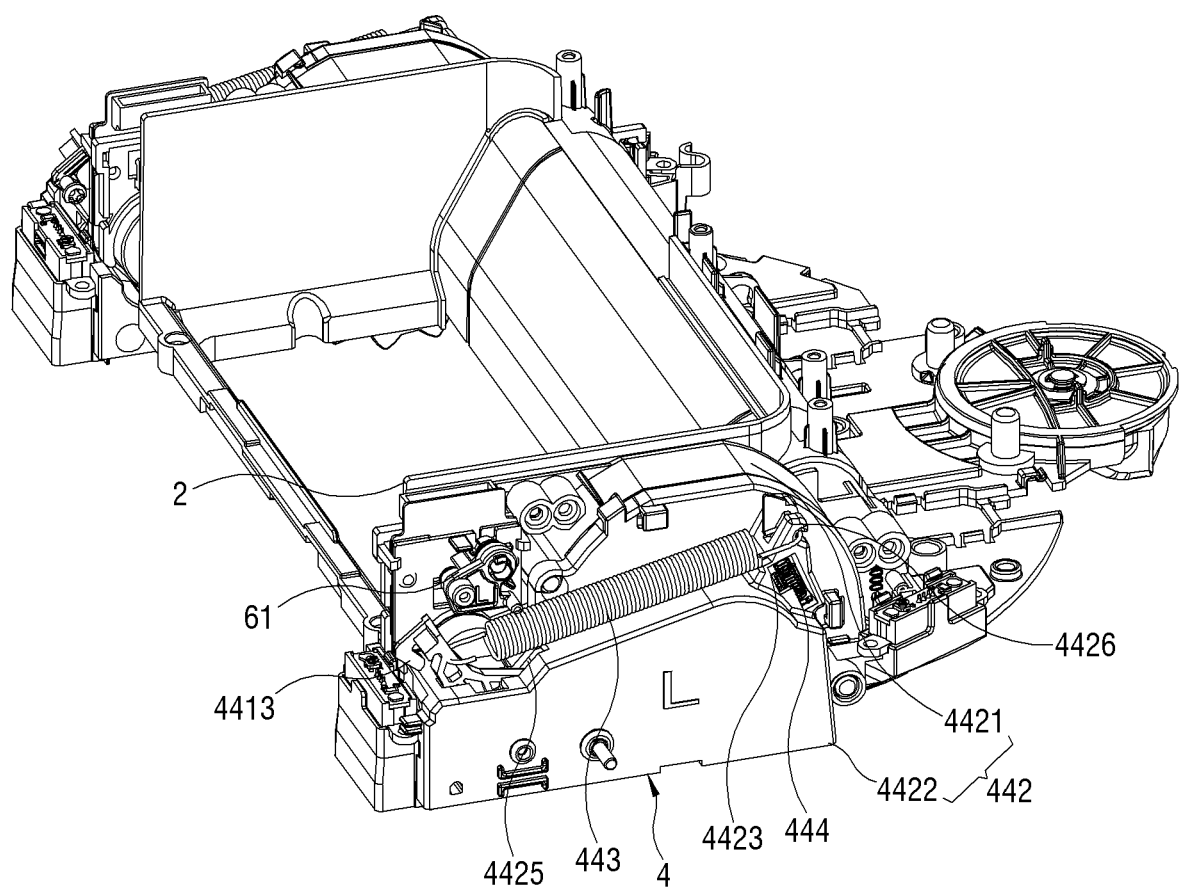
FIG. 3 is a view showing a wheel assembly for a robot cleaner according to an embodiment of the disclosure.
Figure 4:
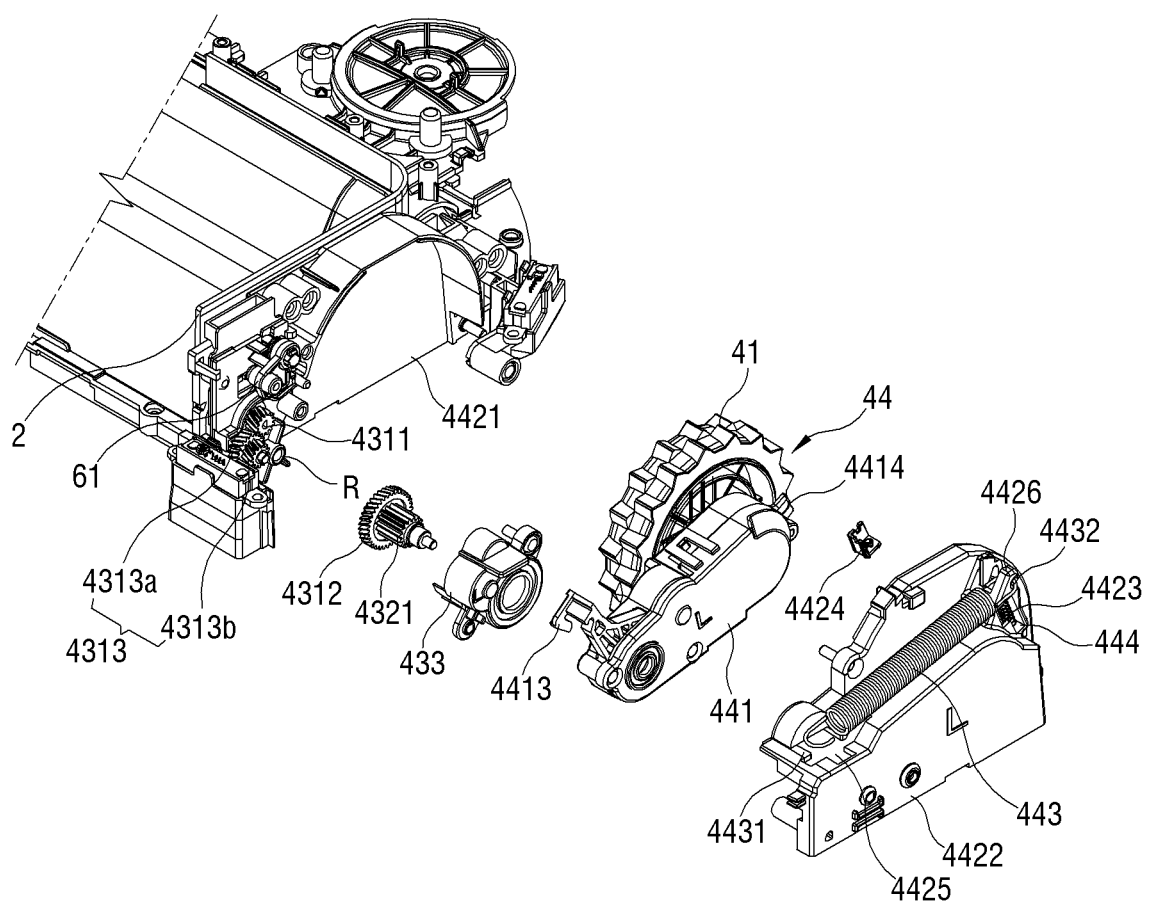
FIG. 4 is a view showing the wheel assembly of FIG. 3, from which a suspension cover and a suspension are disassembled according to an embodiment of the disclosure.
Figure 5:
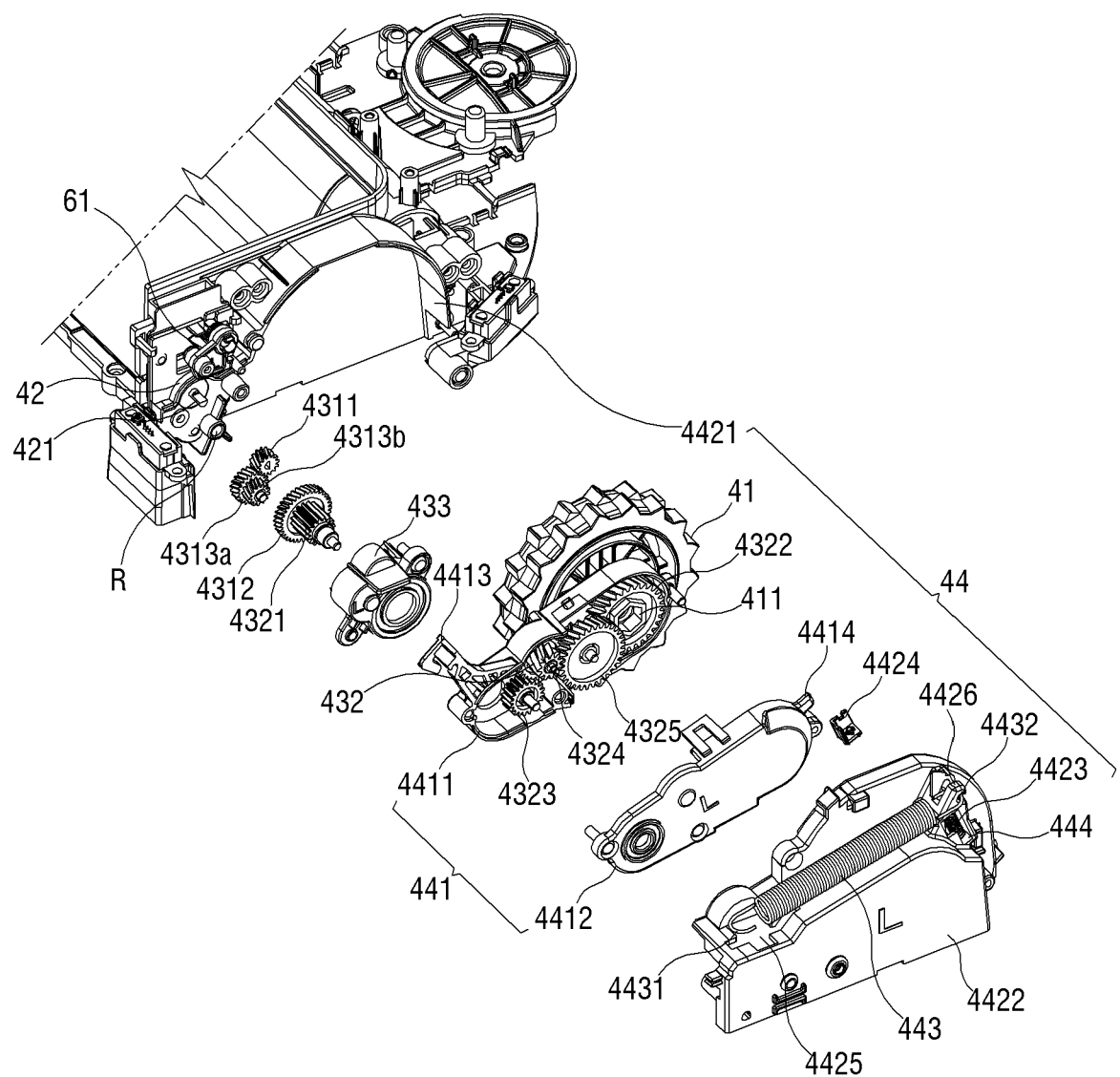
FIG. 5 is an exploded view of the wheel assembly in FIG. 3 according to an embodiment of the disclosure.
Figure 6:
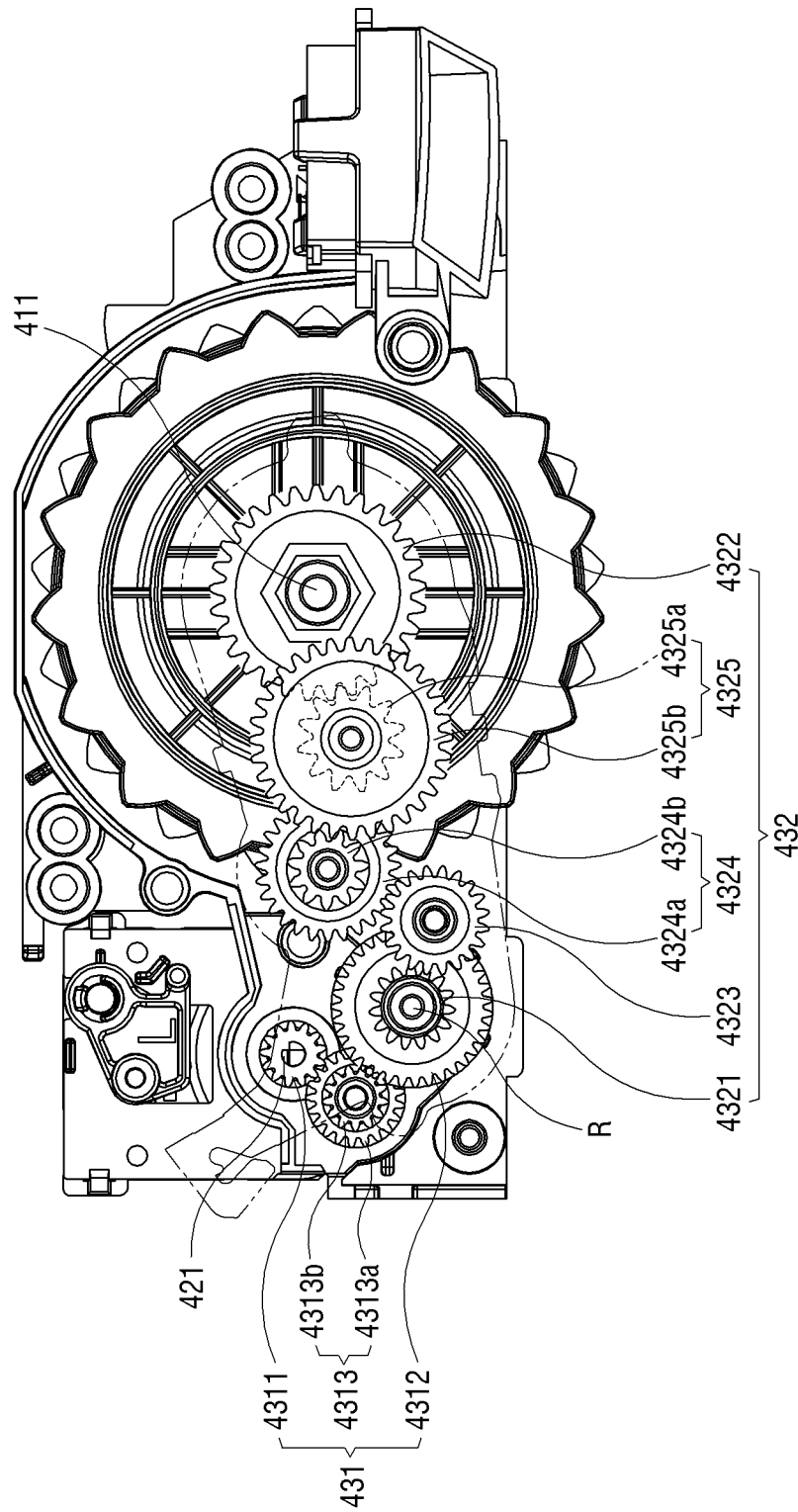
FIG. 6 is a view showing a gear unit according to an embodiment of the disclosure.
Figure 7:
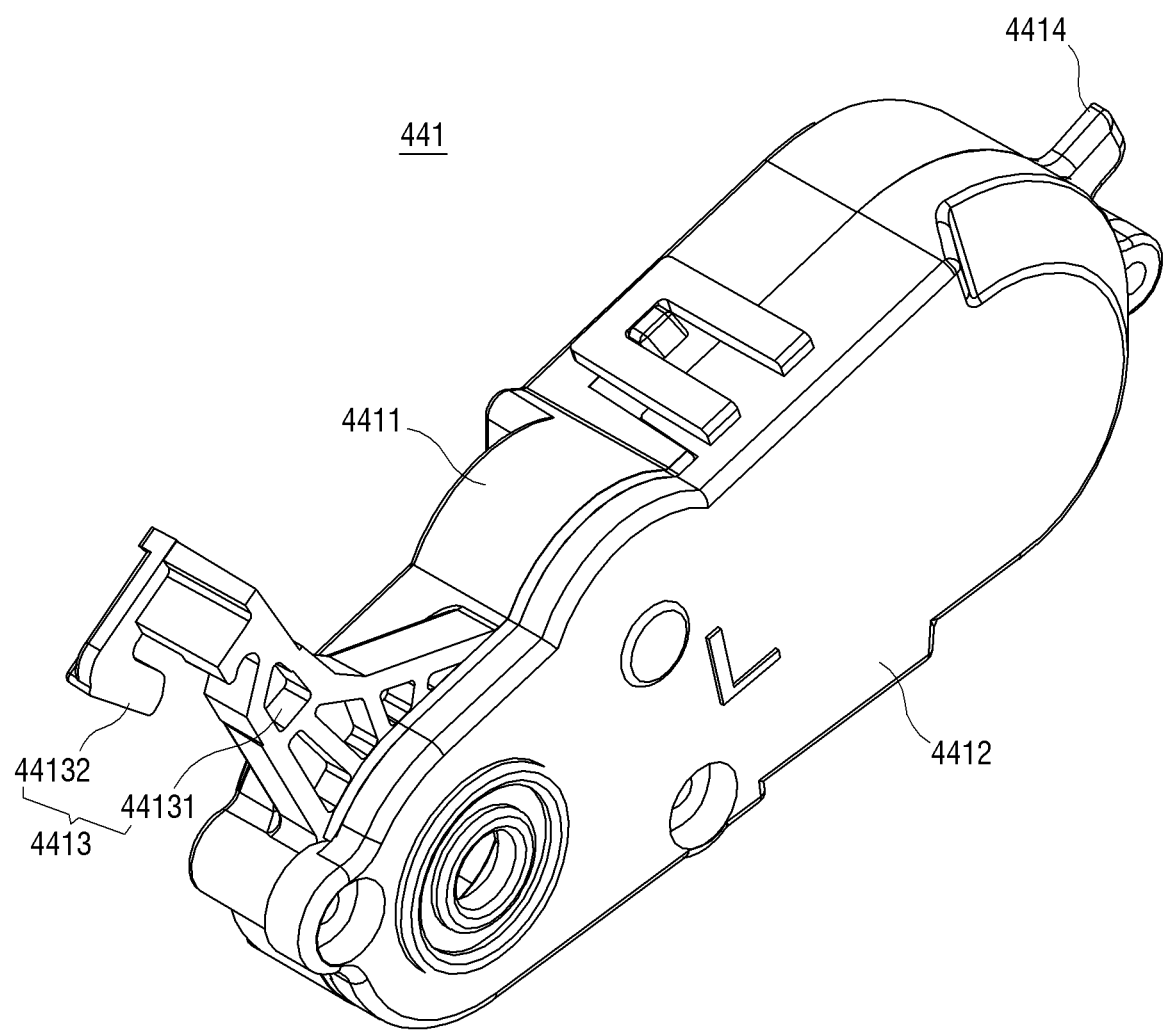
FIG. 7 is a view showing a gear case according to an embodiment of the disclosure.

FIG. 3 is a view showing the wheel assembly 4 for the robot cleaner 1, FIG. 4 is a view showing the wheel assembly 4 of FIG. 3, from which a suspension cover 4422 and a suspension 44 are disassembled, FIG. 5 is an exploded view of the wheel assembly 4 in FIG. 3, FIG. 6 is a view showing a gear unit 43, and FIG. 7 is a view showing a gear case 441.

As shown in FIGS. 3 to 7, the wheel assembly 4 may include the wheel 41, a driving motor 42, the gear unit 43, and the suspension 44.

The wheel 41 may include a plurality of teeth on an outer circumferential surface thereof to travel in the cleaning area without slipping. The cleaner body 2 may be positioned forward or backward with respect to the center of the wheel 41.

The driving motor 42 may be fixed to the cleaner body 2. The driving motor 42 may include a rotatable driving shaft 421. In this way, the driving motor 42 installed in the cleaner body 2 is always fixed regardless of the movement of the suspension 44, thereby preventing the disconnection of electric wires supplying power to the driving motor 42.

The gear unit 43 may, as shown in FIG. 6, include a first gear unit 431 provided between the driving shaft 421 of the driving motor 42 and the pivot R of the suspension 44, and a second gear unit 432 provided between the pivot R and a wheel shaft 411 of the wheel 41.

The first gear unit 431 may include at least one of a helical gear, a worm gear or a spur gear.

The first gear unit 431 may include a circular first gear 4311 fixedly supported on the driving shaft 421 of the driving motor 42, a circular second gear 4312 fixedly supported on the pivot R, and a circular third gear 4313 provided between the first gear 4311 and the second gear 4312. In the third gear 4313, a third lower gear 4313a, and a third upper gear 4313b having a smaller diameter than the third lower gear 4313a are coaxially and integrally supported.

The first gear 4311 engages with the third lower gear 4313a, and the second gear 4312 engages with the third upper gear 4313b.

The third lower gear 4313a may have a larger diameter than the first gear 4311, and the second gear 4312 may have a larger diameter than the third upper gear 4313b. The first gear unit 431 may have a deceleration function of reducing the rotational speed of the driving motor 42. In this way, the pivot R is provided at a position spaced apart from the driving shaft 421 of the driving motor 42, and the first gear unit 431 having the deceleration function is disposed in such a space to reduce noise caused by the rotation of the driving motor 42.

The first gear unit 431 may be accommodated in and covered with a first gear cover 433.

The number of gears that constitute the first gear unit 431 is not limited to three, but may be variously changed. Further, the first gear unit 431 may be replaced by a belt or a chain instead of the gears.

The second gear unit 432 may include a circular fourth gear 4321 having a smaller diameter than the second gear 4312 and coaxially and integrally supported on the second gear 4312, a circular fifth gear 4322 fixedly supported on the wheel shaft 411 of the wheel 41, and circular sixth to eighth gears 4323, 4324 and 4325 provided between and sequentially engaging with the fourth gear 4321 and the fifth gear 4322. In the seventh gear 4324, a seventh lower gear 4324a and a seventh upper gear 4324b having a smaller diameter than the seventh lower gear 4324a may be coaxially and integrally supported. In the eighth gear 4325, an eighth lower gear 4325a and an eighth upper gear 4325b having a larger diameter than the eighth lower gear 4325a may be coaxially and integrally supported.

The sixth gear 4323 engages with both the fourth gear 4321 and the seventh lower gear 4324a, the seventh upper gear 4324b engages with the eighth lower gear 4325a, and the eighth upper gear 4325b engages with the fifth gear 4322.

The gear structure of the second gear unit 432 is not limited to the foregoing description and may be variously changed. Further, the second gear unit 432 may be replaced with a belt or a chain instead of the gears.

The suspension 44 has a first end portion rotatably supported on the pivot R of the cleaner body 2, and a second end portion supporting the wheel 41. The wheel 41 may pivot around the pivot R of the cleaner body 2 while being suspended from the suspension 44.

The pivot R may be provided at a position from which the driving shaft 421 of the driving motor 42 is spaced apart. The pivot R may be provided between the driving shaft 421 of the driving motor 42 and the lower end of the cleaner body 2, preferably as close to the lower end of the cleaner body 2 as possible. In this way, the pivot R is installed to be spaced apart from the driving shaft 421 of the driving motor 42 and disposed to be close to the lower end of the cleaner body 2, and the wheel 41 is therefore increased in stroke for protruding from the lower end of the cleaner body 2 when pivoting, thereby improving ability to climb an obstacle.

The suspension 44 may include a gear case 441, a suspension case 442, a tension spring 443, and a compression spring 444.

The gear case 441 includes a gear accommodating portion 4411 to accommodate the second gear unit 432 for transmitting the power of the driving motor 42 to the wheel 41, and a second gear cover 4412 to cover the gear accommodating portion 4411 while accommodating the second gear unit 432. The gear case 441 may be accommodated in the suspension case 442 pivotally around the pivot R of the cleaner body 2.

The gear case 441 may include a first hook supporter 4413 protruding in an approximately 11 o'clock position from a first end portion thereof supported on the pivot R, and a guide lever 4414 protruding in an approximately 3 o'clock position from a second end portion thereof supporting the wheel 41.

The first hook supporter 4413, as shown in FIG. 7, includes a hook locking portion 44131 to which the first end of the tension spring 443 is locked, and a locking protrusion 44132 to which a locking projection 6122 of an actuator 612 (to be described later) is locked.

The suspension case 442 may include a suspension accommodating portion 4421 to accommodate the gear case 441, and a suspension cover 4422 to cover the suspension accommodating portion 4421. The suspension case 442 may be fixed to the cleaner body 2 while accommodating the gear case 441 in which the wheel 41 is supported.

The suspension case 442 may, as shown in FIG. 3, include an opening 4425 through which the first hook supporter 4413 of the accommodated gear case 441 passes to protrude outward and is allowed to move when the gear case 441 turns, a second hook supporter 4426 provided above a position where the guide lever 4414 of the gear case 441 is covered, and a spring accommodating portion 4423 provide below the second hook supporter 4426.

The spring accommodating portion 4423 may extend approximately perpendicular to an extending direction of the tension spring 443. The spring accommodating portion 4423 may extend in a circumferential or tangential direction of a circle centered on the pivot R.

The spring accommodating portion 4423 may internally include a spring supporter 4424 supporting a lower end portion of the compression spring 444 and movably inserted in the spring accommodating portion 4423. The movement of the spring supporter 4424 in the spring accommodating portion 4423 may be carried out by the guide lever 4414 turning as the suspension 44 turns. The operations of the compression spring 444 will be described in detail later.

The tension spring 443 includes a first hook 4431 at a first end thereof to be hooked to the first hook supporter 4413 of the gear case 441, and a second hook 4432 at a second end thereof to be locked to be hooked to the second hook supporter 4426 of the suspension case 442.

When an angle between the cleaner body 2 and the suspension 44 around the pivot R is decreased by the weight of the cleaner body 2, the first hook supporter 4413 turns counterclockwise, thereby lengthening the tension spring 443. On the other hand, when the angle between the cleaner body 2 and the suspension 44 around the pivot R is increased by an obstacle, the first hook supporter 4413 turns clockwise, thereby restoring the lengthened tension spring 443.

The compression spring 444 may be accommodated in the spring accommodating portion 4423. The compression spring 444 may have a first end portion coupled to a first projection provided at an upper end of the spring accommodating portion 4423, and a second end portion coupled to a second projection provided in the spring supporter 4424.

Figure 8:
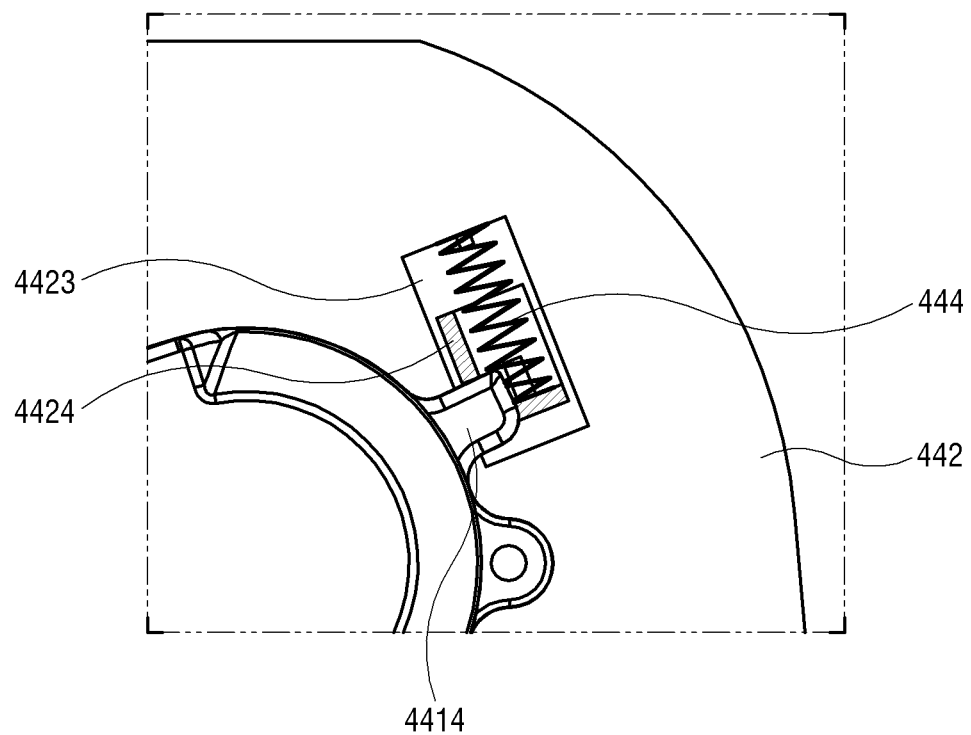
FIG. 8 is a view showing a state before a compression spring works according to an embodiment of the disclosure.
Figure 9:
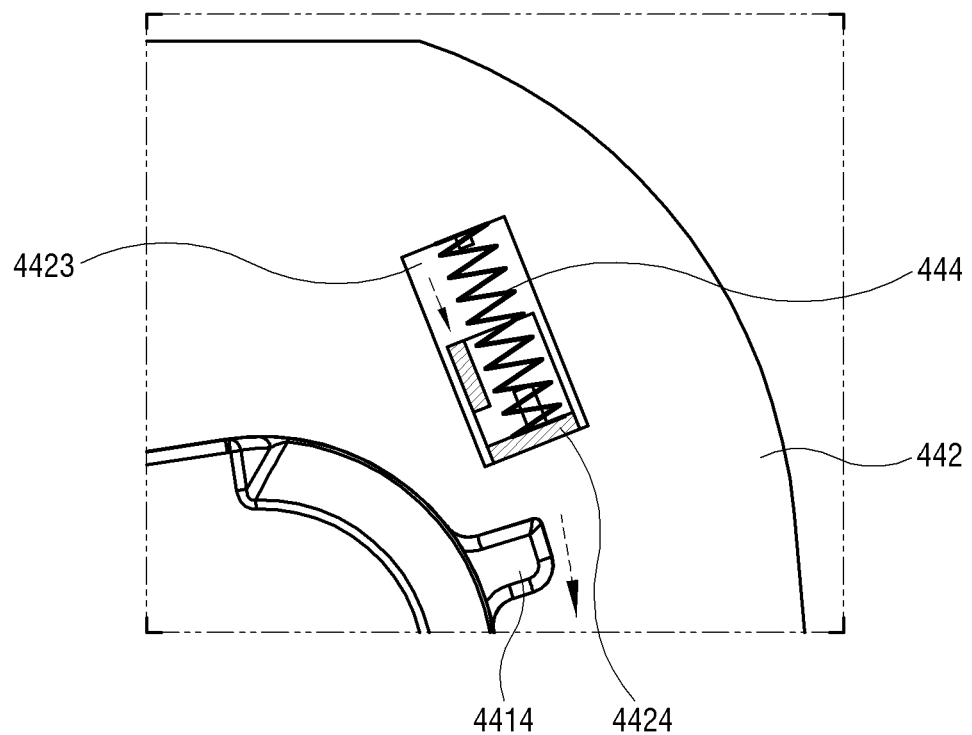
FIG. 9 is a view showing a state after a compression spring works according to an embodiment of the disclosure.

FIGS. 8 and 9 are views showing states before and after the compression spring 444 works.

As shown in FIG. 8, in a state before the suspension 44 turns, the spring supporter 4424 may float at a predetermined distance from the bottom of the spring accommodating portion 4423 by the guide lever 4414 while compressing the compression spring 444.

As shown in FIG. 9, the compression of the compression spring 444 may be released while the guide lever 4414 turns clockwise as the suspension 44 turns. Therefore, the floated spring supporter 4424 may fall from the floating state to the bottom of the spring accommodating portion 4423 by the restoring force of the compression spring 444. Then, when the suspension 44 further turns, the guide lever 4414 is allowed to additionally turn while being separated from the spring supporter 4424. In other words, the compression spring 444 is no longer involved in turning the suspension 44 after the spring supporter 4424 is positioned on the bottom of the spring accommodating portion 4423.

Figure 10:
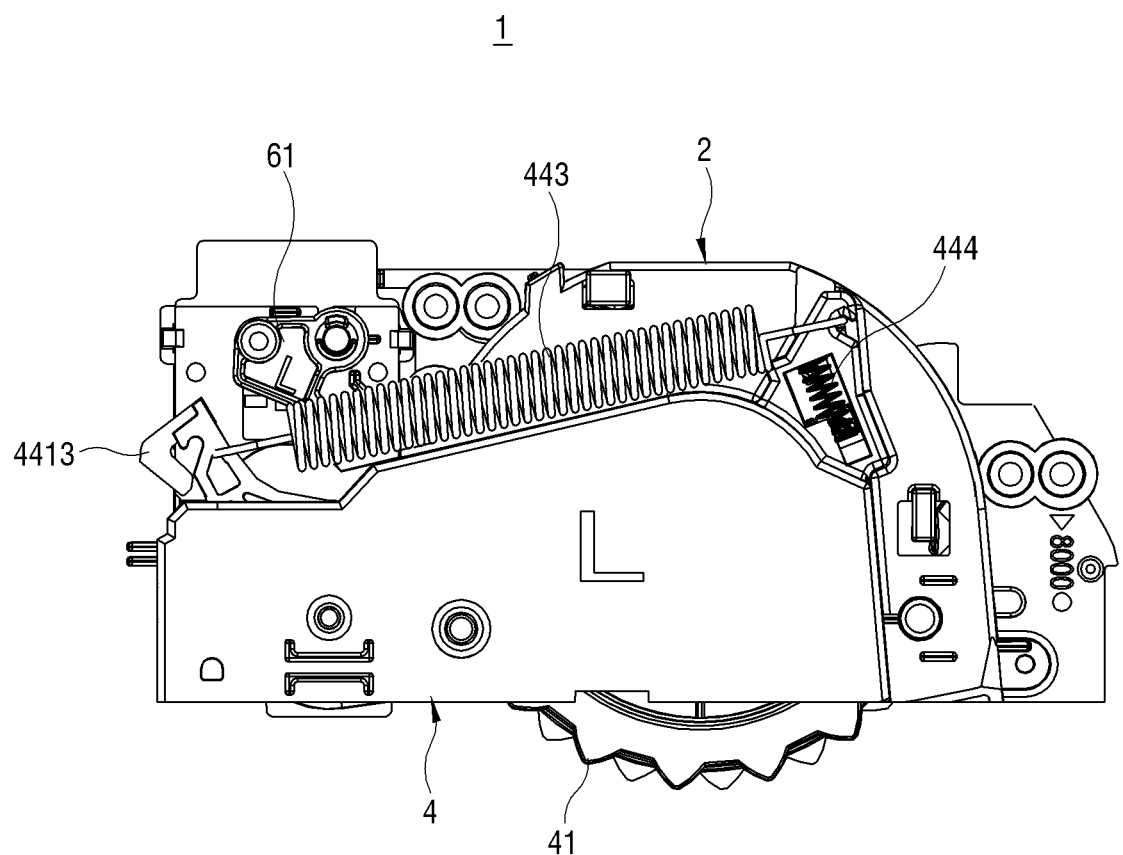
FIG. 10 is a view showing a state before a tension spring of a robot cleaner works according to an embodiment of the disclosure.
Figure 11:
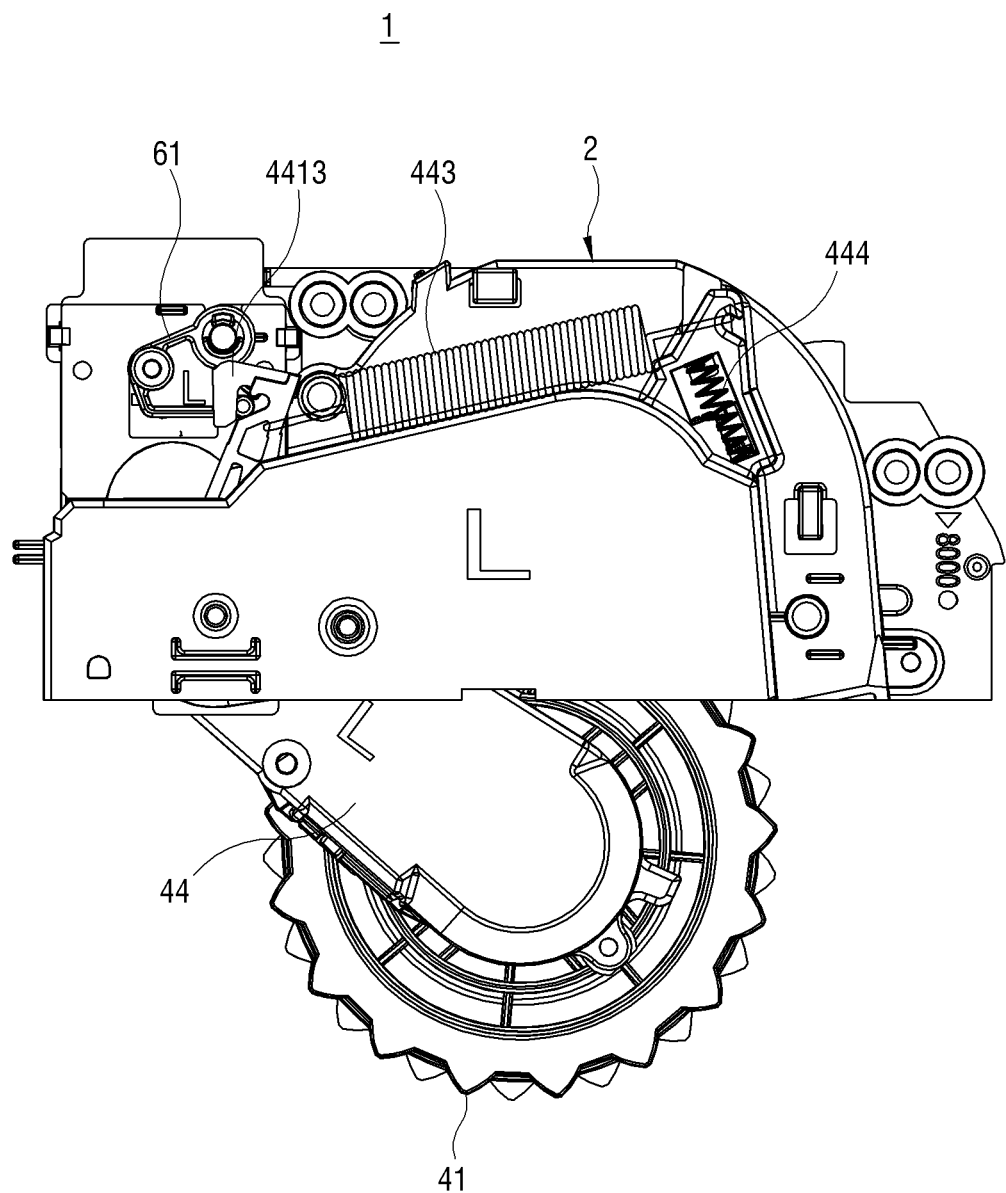
FIG. 11 is a view showing a state after a tension spring of a robot cleaner works according to an embodiment of the disclosure.

FIGS. 10 and 11 are views showing states before and after the tension spring 443 works.

As shown in FIGS. 8 and 10, the cleaner body 2 may move toward the ground by its own weight. In this case, the first hook supporter 4413 turns counterclockwise, thereby elastically stretching the tension spring 443 as much as the weight and compressing the compression spring 444 with the guide lever 4414. In this way, the cleaner body 2 travels while the tension restoring force of the tension spring 443 and the compression repulsive force of the compression spring 444 acts in an opposite direction to the ground, and therefore is in a state of being easily lifted from the ground with a weak force. In particular, the cleaner body 2 has the center of gravity at a front side thereof in a traveling direction, and therefore the wheel 41 located at a rear side is more likely to be lifted when colliding with an obstacle while traveling.

As shown in FIGS. 9 and 11, the cleaner body 2 may be lifted by the tension restoring force of the tension spring 443 and the compression repulsive force of the compression spring 444 when the cleaner body 2 collides with an obstacle or an obstacle is put between the cleaner body 2 and the ground while traveling. In this case, the cleaner body 2 is initially lifted as both the tension spring 443 and the compression spring 444 work, and crosses the obstacle as only the tension spring 443 works when the cleaner body 2 is lifted above a threshold, e.g., 3.5 mm.

The cleaner body 2 may further include a stopper to restrict the suspension 44, which turns in one direction due to the weight of the cleaner body 2 and in the opposite direction due to the restoring force of the tension spring 443, not to exceed a predetermined threshold.

The first hook supporter 4413 may turn clockwise together with the suspension 44 pivoting around the pivot R. In this case, the first hook supporter 4413 may operate a lift detector 61 provided on a turning path thereof.

The lift detector 61 may detect whether the wheel 41 is lifted from the cleaner body 2 by the obstacle.

Figure 12:
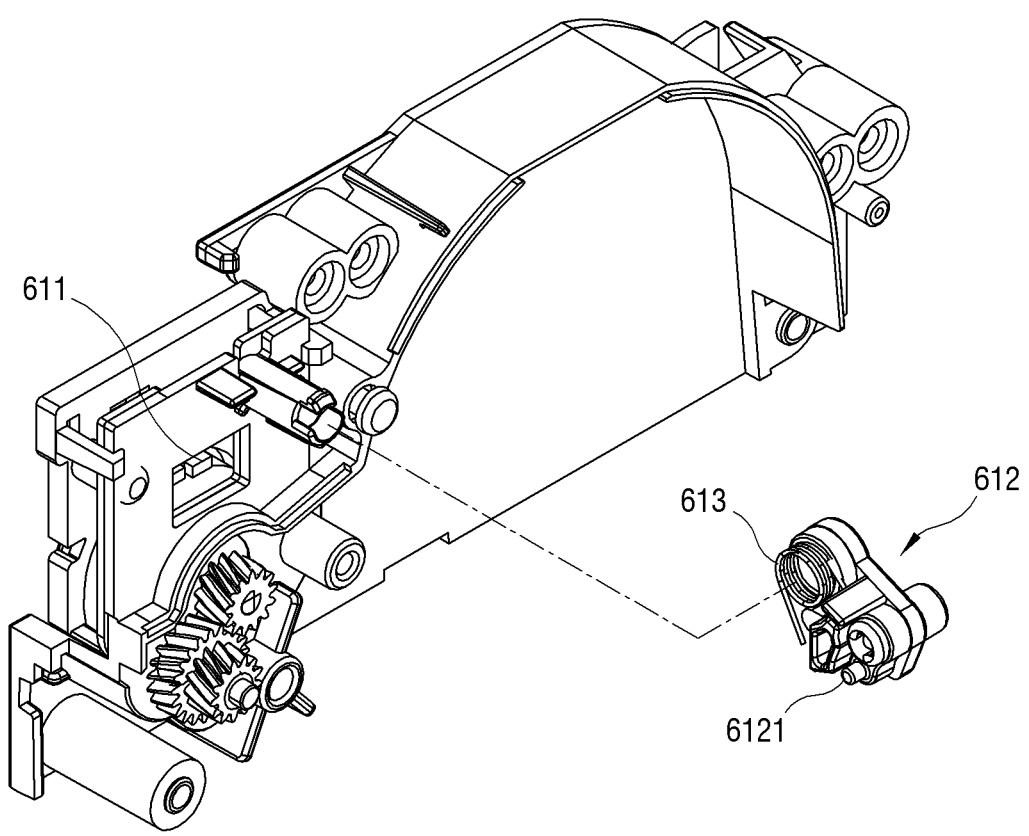
FIG. 12 is an exploded view of a lift detector according to an embodiment of the disclosure.
Figure 13:
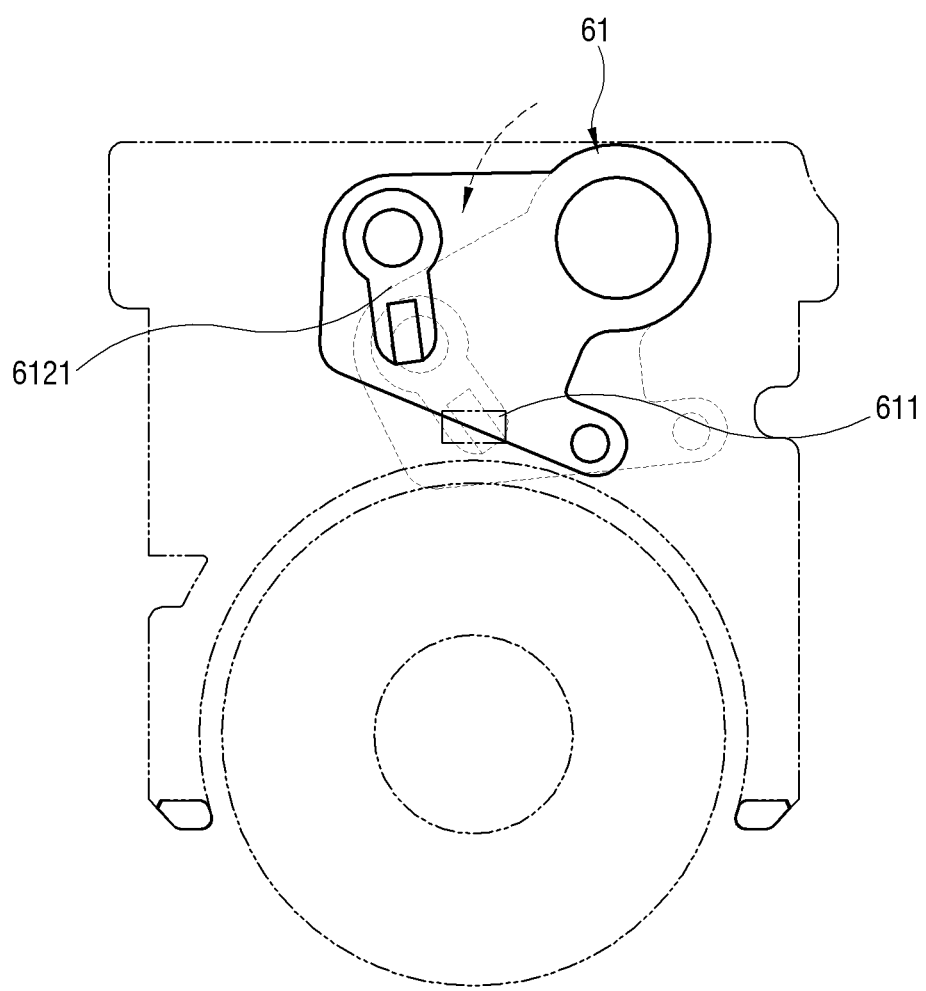
FIG. 13 is a view showing a state before a lift detector operates according to an embodiment of the disclosure.
Figure 14:
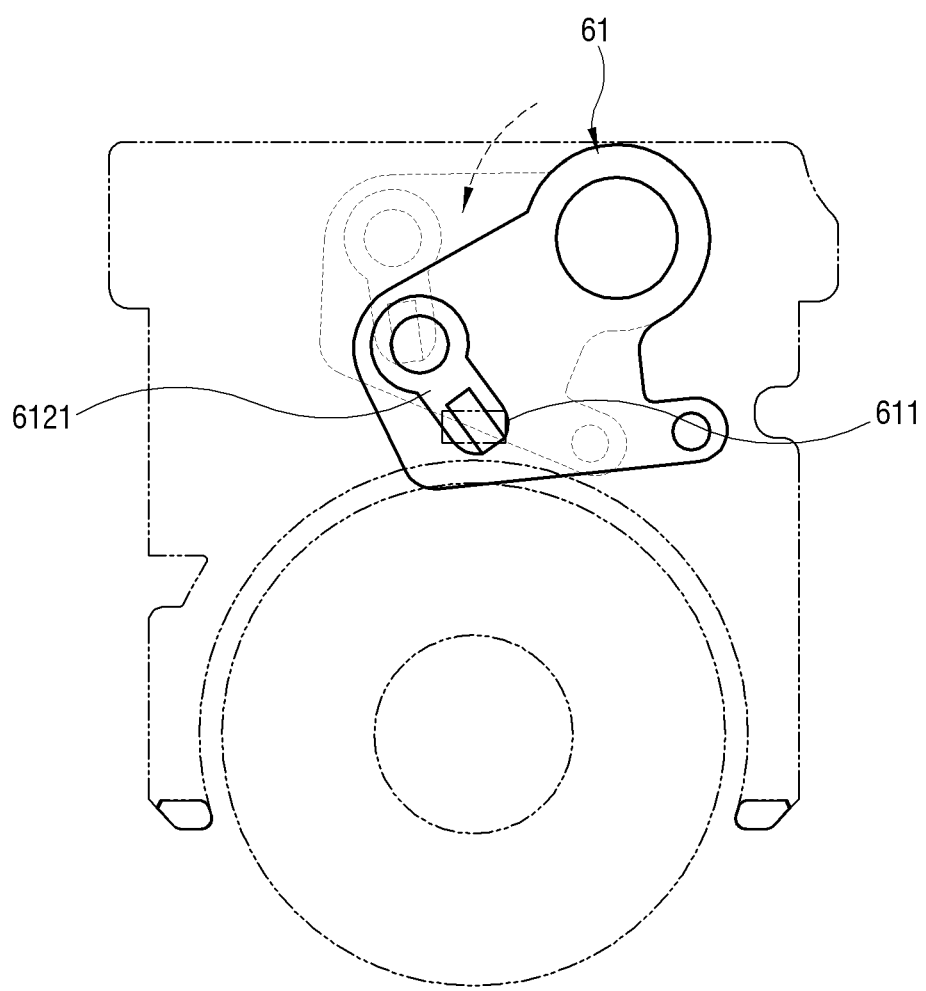
FIG. 14 is a view showing a state after a lift detector operates according to an embodiment of the disclosure.

FIG. 12 is an exploded view of the lift detector 61, FIG. 13 is a view showing a state before the lift detector 61 operates, and FIG. 14 is a view showing a state after the lift detector 61 operates.

Referring to FIG. 12, the lift detector 61 may include a magnet sensor 611 provided in the cleaner body 2, and an actuator 612 supporting a magnet 6121 and rotatably supported by the cleaner body 2.

The magnet sensor 611 may be positioned on a turning path of the magnet 6121 supported in the actuator 612. When the magnet 6121 is detected, the magnet sensor 611 identifies that the wheel 41 is lifted as the suspension 44 turns.

The actuator 612 may turn from an initial position to a detecting position as the first hook supporter 4413 turns. The actuator 612 may include the magnet 6121 provided at a position where the magnet sensor 611 passes when turning, and the locking projection 6122 locked to the turning first hook supporter 4413. The actuator 612 may turn as the locking projection 6122 is locked to a locking protrusion 43122 of the first hook supporter 4413. In this case, the magnet 6121 coincides with the magnet sensor 611 on the turning path as the actuator 612 turns. When the magnet 6121 is detected, the magnet sensor 611 enters an ON state and a controller 5 identifies that the robot cleaner 1 is caught by the obstacle.

The lift detector 61 may include a torsion spring 613 provided in a rotary shaft 6122 of the actuator 612.

The torsion spring 613 accumulates a torque force in an opposite direction when the actuator 612 turns from the initial position of FIG. 13 to the detecting position, and is restored by releasing the accumulated torque force when the actuator 612 returns from the detecting position to the initial position. As the torsion spring 613 makes the actuator 612 return to the initial position, the magnet sensor 611 maintains an OFF state.

In FIG. 13, the magnet 6121 is spaced apart from the magnet sensor 611. In this case, the locking projection 6122 of the actuator 612 may be caught by the locking protrusion 44132 of the turning first hook supporter 4413. As a result, the actuator 612 may turn counterclockwise.

When the actuator 612 turns counterclockwise in FIG. 13, the magnet 6121 is put to coincide with the magnet sensor 611 as shown in FIG. 14.

On the other hand, when the first hook supporter 4413 turns counterclockwise in FIG. 14, the actuator 612 turns clockwise by the torsion spring 613 and the magnet 6121 returns to the initial position spaced apart from the magnet sensor 611.

As described above, the first hook supporter 4413 according to the disclosure may be more increased in its pivoting range than that to which the magnet is mounted. As a result, the robot cleaner 1 according to the disclosure is increased in the stroke of the wheel 41 because the pivoting range, i.e., the pivoting angle of the suspension 44 is increased by the actuator 612 when the suspension 44 pivots. As the height of the wheel 41 protruding from the cleaner body 2 increases, the grip weakened due to the protrusion of the wheel 41 is decreased. As a result, the robot cleaner 1 is improved in performance of climbing an obstacle.

The lift detector 61 is not limited to the magnet sensor 611, and may for example be implemented by other sensors such as a micro switch, a touch sensor, and a motion sensor.

Figure 15:
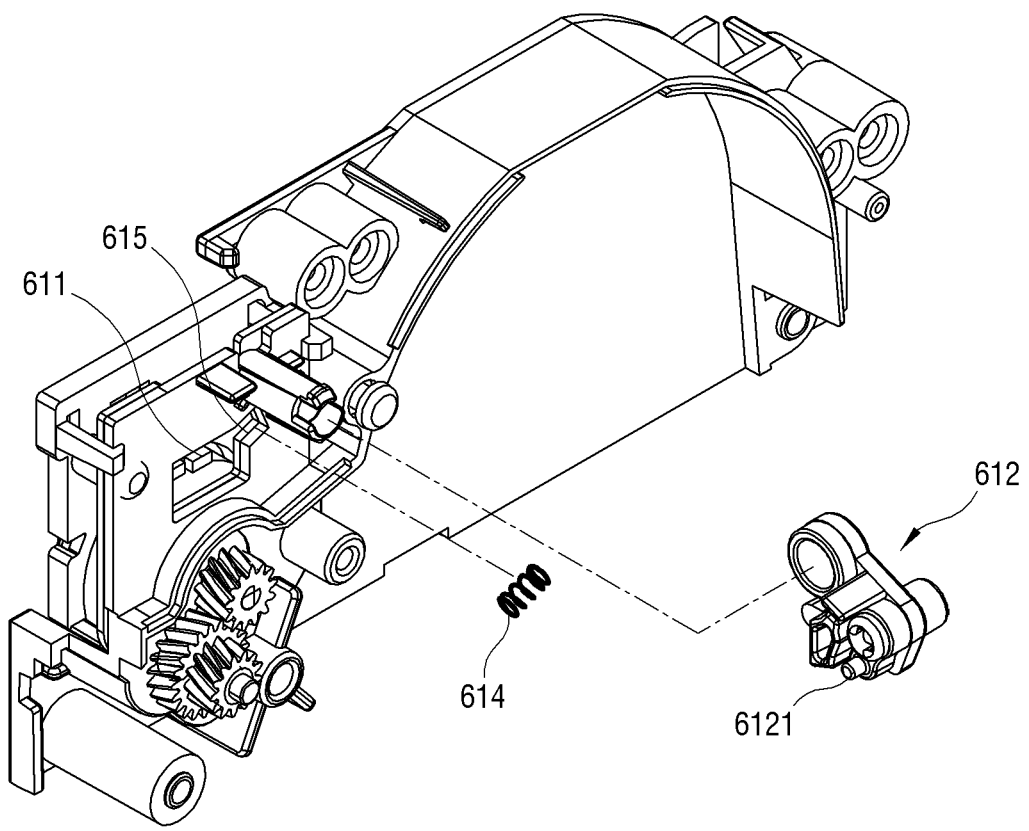
FIG. 15 is a view showing a lift detector according to an embodiment of the disclosure.

FIG. 15 is a view showing the lift detector 61 according to a second embodiment of the disclosure.

Referring to FIG. 15, the lift detector 61 may include a pressurization spring 614 and a spring mounting groove 615.

The pressurization spring 614 may be used instead of the torsion spring 613 of FIG. 12. The pressurization spring 614 may be compressed when the actuator 612 turns from the initial position to the detecting position, and restored when the actuator 612 returns from the detecting position to the initial position.

The spring mounting groove 615 may be recessed along the turning direction of the actuator 612 and accommodate the pressurization spring 614 therein.

The pressurization spring 614 may be compressed when the actuator 612 turns counterclockwise and restored when the actuator 612 turns clockwise.

Figure 16:
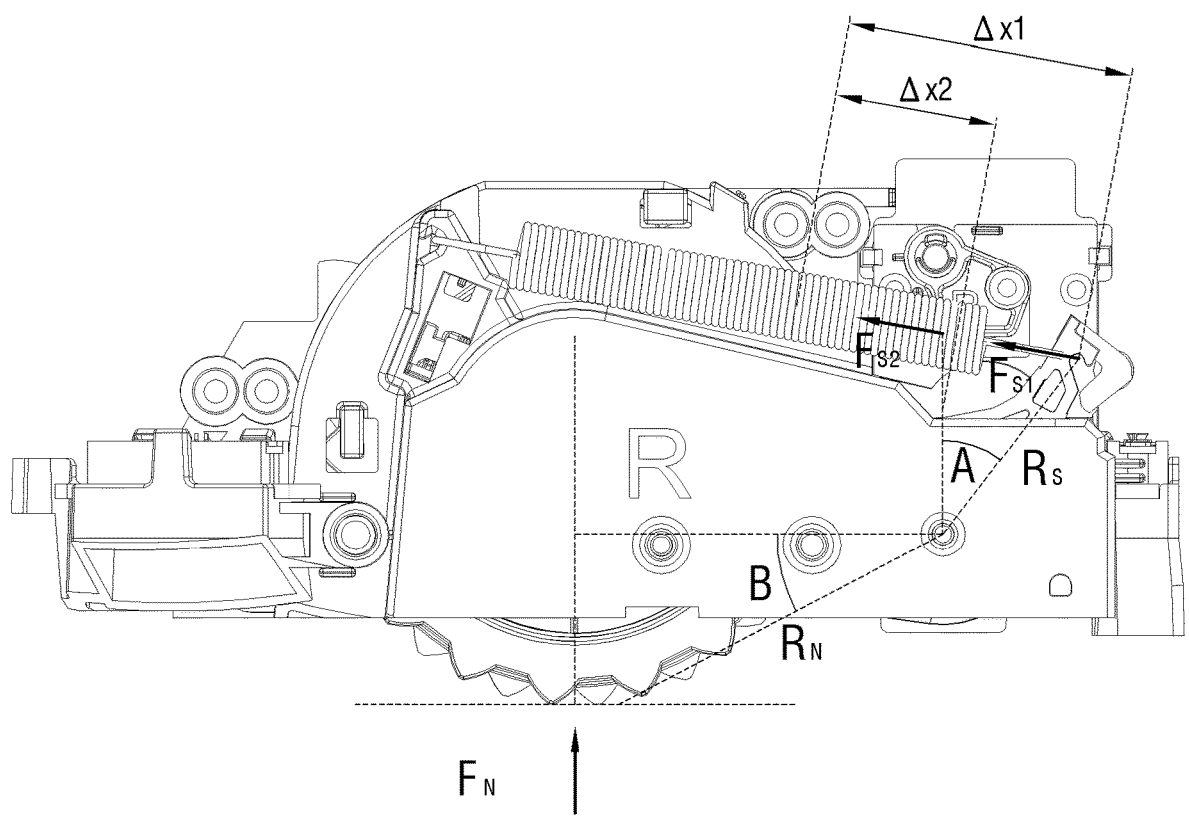
FIG. 16 is a view for explaining a relationship between an installation position of a suspension and grip according to an embodiment of the disclosure.

FIG. 16 is a view for explaining a relationship between an installation position of the suspension 44 and grip $F_N$.

The grip $F_N$ may be defined by the following Equation 1.

$$\text{Grip } F_N = \frac{R_S \times \cos A}{R_N \times \cos B} \times (k\Delta x) \quad \text{[Equation 1]}$$

As shown in FIG. 16, $R_N$ is a distance from the pivot R to a circumferential contact point N of the wheel 41 being in contact with the ground, $R_S$ is a distance from the pivot R to the end S of the tension spring 443, A is a pivoting angle of the suspension 44, B is a protruding angle of the wheel 41, and $k\Delta x$ is a tensile force of the tension spring 443.

Therefore, the grip $F_N$ may be improved by increasing cos A and $k\Delta x$. In this case, the protruding angle B of the wheel 41 is dependent on the pivoting angle A of the suspension 44.

Figure 17:
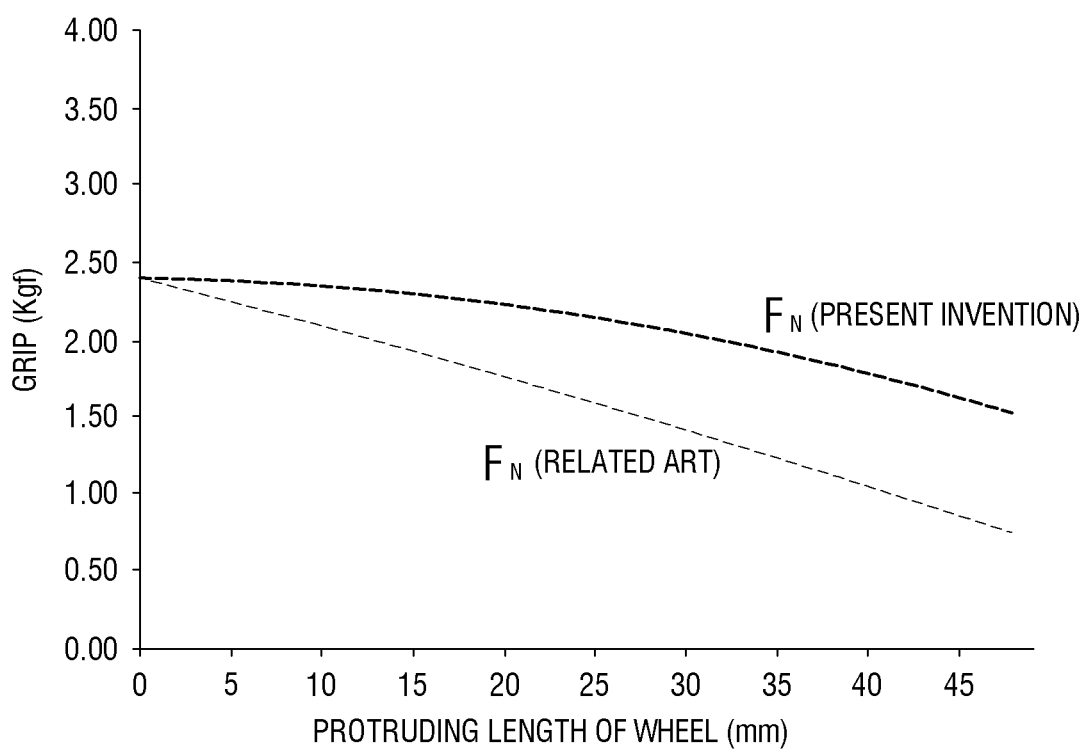
FIG. 17 is a graph showing a relationship between stroke strength and grip of a wheel according to an embodiment of the disclosure.

FIG. 17 is a graph showing a relationship between stroke strength and grip $F_N$ of the wheel 41. The stroke strength of the wheel 41 is proportional to the protruding length of the wheel 41.

As shown in FIG. 17, the grip $F_N$ is greatest when the traveling wheel 41 protrudes lowest, and decreases as the protruding length of the wheel 41 increases. According to the disclosure, the grip $F_N$ is gently decreased as the protruding length of the wheel 41 increases as compared with that of a conventional one. This is a result obtained by placing the pivot R of the suspension 44 close to the lower end of the cleaner body 2, disposing the first hook supporter 4413 at an angle as large as possible with respect to a vertical line passing through the pivot R, and using the actuator 612 including the magnet 6121. In other words, when the pivoting range of the suspension 44 increases, a difference between the maximum stretched length and the minimum restored length of the tension spring 443 increases and a difference between the maximum grip and the minimum grip of the traveling state also increases, thereby gently decreasing the grip $F_N$ due to the climbing.

Figure 18:
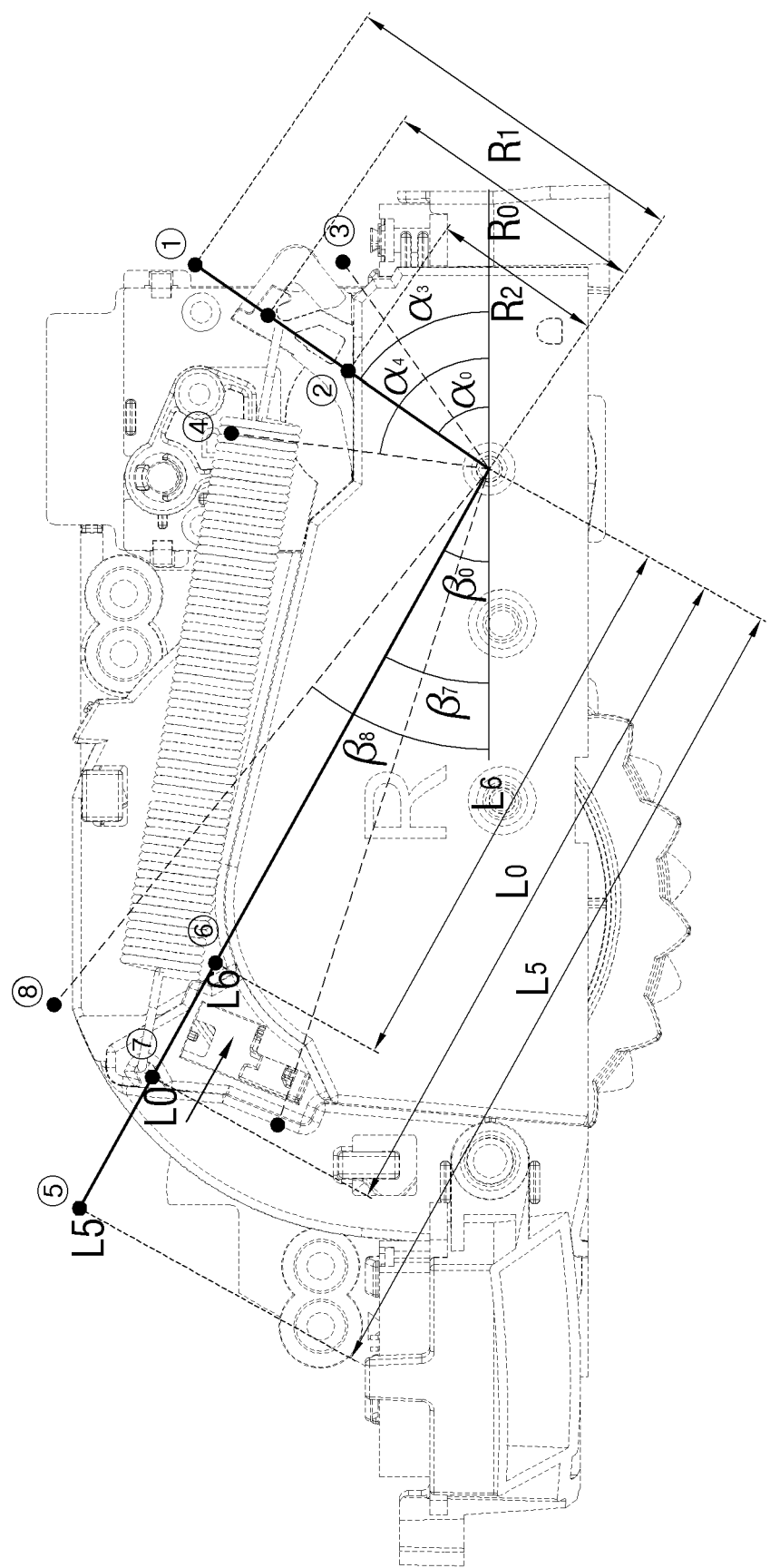
FIG. 18 is a view showing conditions for changing a clamping position of a suspension according to an embodiment of the disclosure.

FIG. 18 is a view showing conditions for changing a clamping position of the suspension 44, and FIG. 19 is a table in which the grip $F_N$ varied depending on the clamping positions of the suspension 44 is tabulated.

Referring to FIGS. 18 and 19, the clamping position of the suspension 44 may be varied as follows.

①  When the length $R_x$ from the pivot R to the close first end portion of the tension spring 443 increases, traveling and climbing spring tension $F_{S1}$ decreases compared to the spring tension $F_{S0}$ before change.

②  When the length $R_x$ from the pivot R to the close first end portion of the tension spring 443 decreases, the traveling and climbing spring tension $F_{S1}$ increases compared to the spring tension $F_{S0}$ before change.

③  When the first end portion of the tension spring 443 is pivoted clockwise around the pivot R, the traveling and climbing spring tension $F_{S1}$ increases compared to the spring tension $F_{S0}$ before change.

④  When the first end portion of the tension spring 443 is pivoted counterclockwise around the pivot R, the traveling and climbing spring tension $F_{S1}$ decreases compared to the spring tension $F_{S0}$ before change.

⑤  When the length $L_x$ from the pivot R to the distant second end portion of the tension spring 443 increases, the traveling and climbing spring tension $F_{S1}$ increases compared to the spring tension $F_{S0}$ before change.

⑥  When the length $L_x$ from the pivot R to the distant second end portion of the tension spring 443 decreases, the traveling and climbing spring tension $F_{S1}$ decreases compared to the spring tension $F_{S0}$ before change.

⑦  When the second end portion of the tension spring 443 is pivoted counterclockwise around the pivot R, the traveling and climbing spring tension $F_{S1}$ increases compared to the spring tension $F_{S0}$ before change.

⑧  When the second end portion of the tension spring 443 is pivoted clockwise around the pivot R, the traveling and climbing spring tension $F_{S1}$ decreases compared to the spring tension $F_{S0}$ before change.

To improve the traveling and climbing grip $F_N$, the conditions ②, ③, ⑤, and ⑦ may be adjusted.

The grip $F_N$ may be expressed as follows.

$$F_N(\text{grip}) = AL_x + BR_x + C\alpha_x + D\beta_x$$

FIG. 20 is a table in which the grip $F_N$ varied depending on the clamping positions of the suspension 44 are tabulated.

To check each contribution of the conditions $R_2(②)$, $α_3(③)$, $L_5(⑤)$, and $β_7(⑦)$ to the grip $F_N$, the grip $F_N$ was measured under the conditions 27 mm (0.9*$R_0$), 46.8° (0.9*$α_0$), 88 mm (1.1*$L_0$), and 27° (0.9*$β_0$) set by increasing or decreasing the reference values 30 mm ($R_0$), 52° ($α_0$), 80 mm ($L_0$), and 30° ($β_0$) by 10%.

Referring to FIG. 20, the grips $F_N$ under the conditions $R_2(②)$, $α_3(③)$, $L_5(⑤)$, and $β_7(⑦)$ are 0.95 kgf, 0.94 kgf, 0.98 kgf, the and 0.92 kgf, respectively. Therefore, the contribution to the grip $F_N$ is large in the order of $L_5(⑤)$, $R_2(②)$, $α_3(③)$, and In this case, it will be understood that the grip FN is directly affected by a spring force $F_s$.

Figure 21:
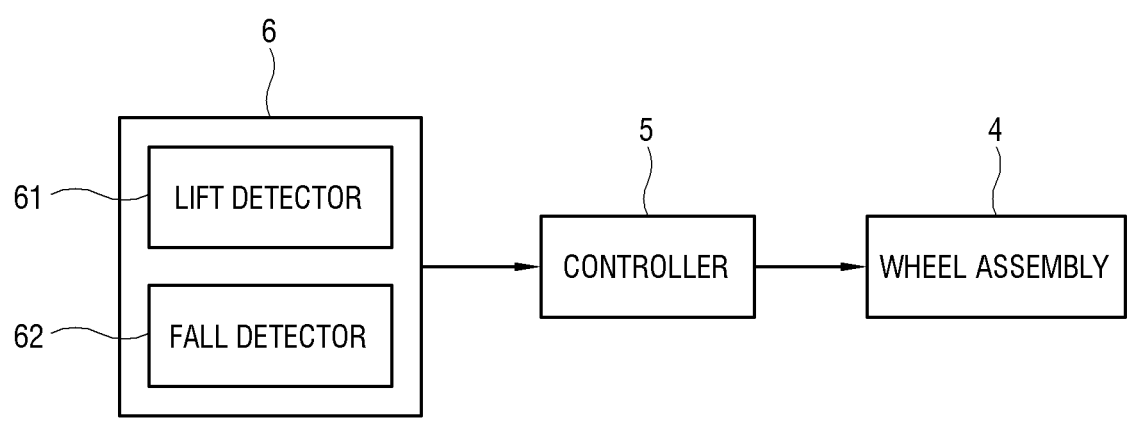
FIG. 21 is a block diagram of a robot cleaner according to an embodiment of the disclosure.

FIG. 21 is a block diagram of the robot cleaner 1.

As shown in FIG. 21, the robot cleaner 1 may include the wheel assembly 4, the controller 5, and the sensor unit 6.

The wheel assembly 4 is driven under control of the controller 5 so that the cleaner body 2 can travel through the cleaning area.

The controller 5 generally controls the elements of the robot cleaner 1.

The controller 5 may control the driving motor 42 of the wheel assembly 4 based on conditions of obstacles detected by the sensor unit 6, for example, the height of the obstacle, the height of a fall, etc.

The controller 5 executes a control program (or instruction) to perform control operations. The controller 5 includes at least one general-purpose processor, for example, a central processing unit (CPU), an application processor (AP), or a microprocessor, which loads at least a part of the control program from a nonvolatile memory where the control program is installed and executes the loaded control program.

The controller 5 according to the disclosure may be implemented as being included in a main system on chip (SoC) mounted onto a printed circuit board (PCB) internally provided in the robot cleaner 1.

The sensor unit 6 may include the lift detector 61 and a fall detector 62.

The lift detector 61 may detect whether an obstacle is caught between the ground and the cleaner body. When the lift detector 61 enters an ON state, the controller 5 may stop the traveling and identify whether to cross or bypass the obstacle based on a detection value of the fall detector 62.

The fall detector 62 may measure the height of the obstacle and/or the height of the fall when the lift detector 61 is in the ON state.

Figure 22:
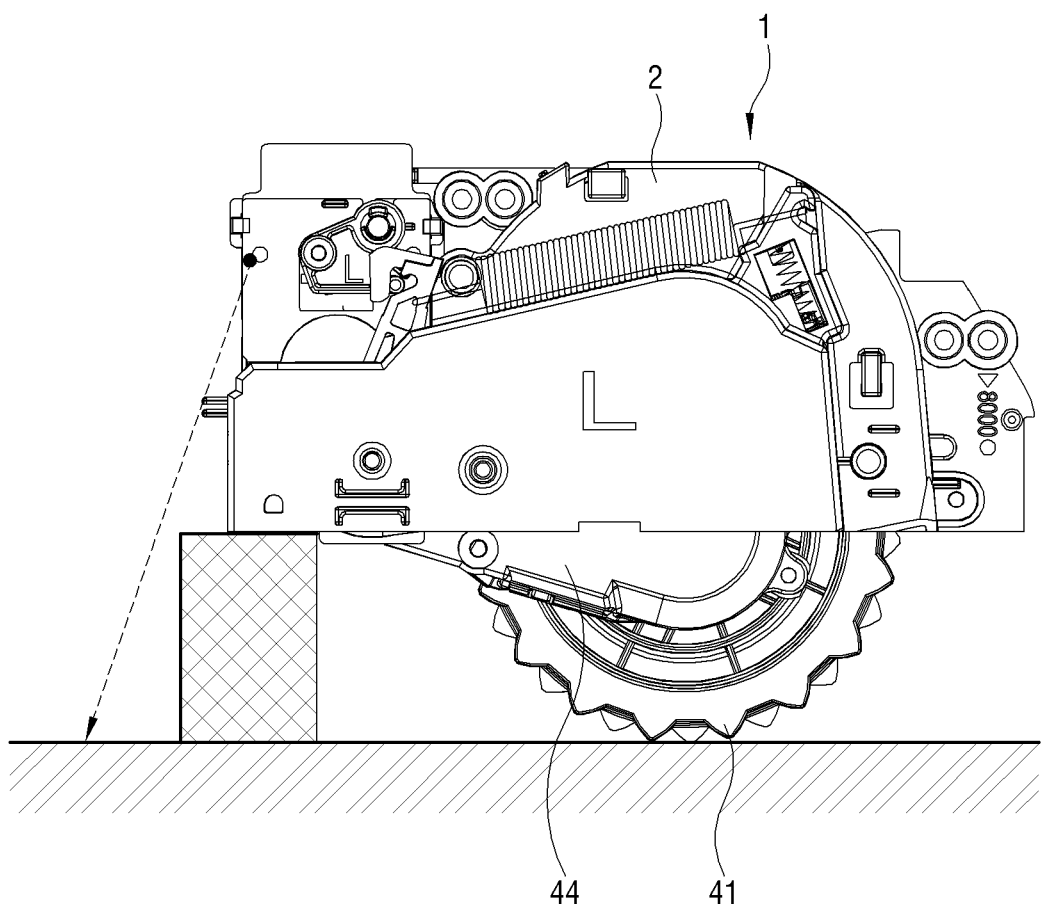
FIG. 22 is a view illustrating that a robot cleaner collides with an obstacle while traveling according to an embodiment of the disclosure.

FIG. 22 is a view illustrating that the robot cleaner 1 collides with an obstacle while traveling. When the robot cleaner 1 collides with an obstacle located in front thereof, the cleaner body 2 is lifted and the wheel 41 may come into contact with the obstacle. In this case, the fall detector 62 may primarily measure the height of the obstacle located in front thereof, and transmit the measured height to the controller 5. The controller 5 may make a decision to climb the obstacle when the height of the obstacle is not greater than, for example, 10 cm, and make a decision to bypass the obstacle when the height is greater than 10 cm.

Figure 23:
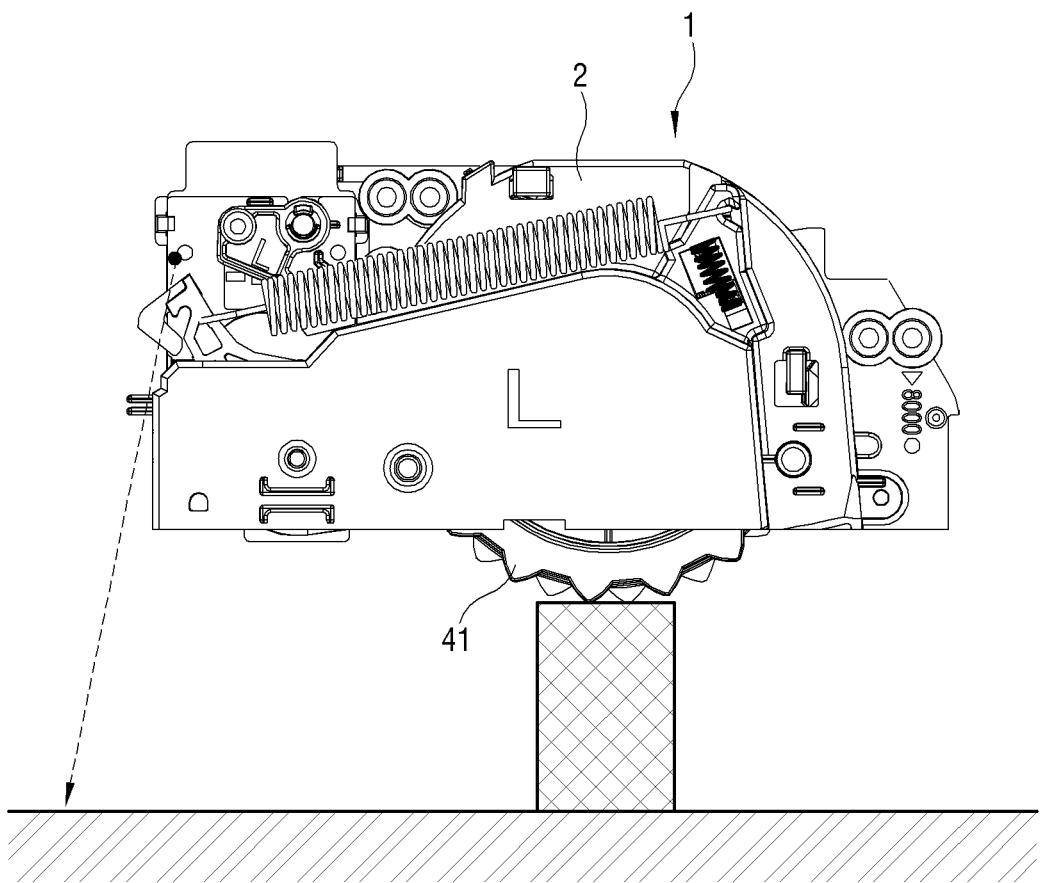
FIG. 23 is a view illustrating that a robot cleaner is positioned on an obstacle while climbing according to an embodiment of the disclosure.

FIG. 23 is a view illustrating that the robot cleaner 1 is positioned on an obstacle while climbing. In this case, the fall detector 62 may secondarily measure a fall distance from the obstacle, and transmit the measured distance to the controller 5. The controller 5 may make a decision to climb the obstacle when the distance from the top of the obstacle to the floor is no longer than, for example, 7 cm, and make a decision to bypass the obstacle when the distance is longer than 7 cm.

As described above, the robot cleaner 1 according to the disclosure identifies the conditions of an obstacle two times when climbing the obstacle, thereby improving the climbing performance.

Although a few embodiments of the disclosure have been illustrated and described, the disclosure is not limited to the foregoing embodiments, and various alternative embodiments can be made by a person having ordinary knowledge in the art without departing from the scope of the disclosure defined in claims, and appreciated within the technical concept or trend of the disclosure.

What is claimed is:

1. A robot cleaner comprising:
   a cleaner body;
   a motor, configured to be fixed to the cleaner body, and provide a rotational force;
   a gear unit configured to transmit the rotational force of the motor;
   a wheel configured to rotate and drive the cleaner body according to the rotational force of the motor transmitted by the gear unit to the wheel; and
   a suspension comprising:
   a first end portion pivotally supportable on a pivot of the cleaner body, which is spaced apart from a rotary shaft of the motor, and
   a second end portion to extend from the first end portion and support the wheel to be moveable relative to the cleaner body while the motor is fixed to the cleaner body whereby the wheel moves up with respect to the cleaner body as the second end portion moves in a first direction around the pivot of the cleaner body and the wheel moves down with respect to the cleaner body as the second end portion moves in a second direction around the pivot of the cleaner body,
   wherein an axis of the pivot of the cleaner body is horizontally located between the rotary shaft of the motor supported on the cleaner body and a lower end of the cleaner body, and closer to the lower end of the cleaner body than the rotary shaft.

2. The robot cleaner of claim 1, wherein the gear unit comprises a first gear unit provided between the rotary shaft of the motor and the pivot of the cleaner body, and a second gear unit provided between the pivot of the cleaner body and a wheel shaft of the wheel.

3. The robot cleaner of claim 2, wherein the first gear unit comprises a reduction gear.

4. The robot cleaner of claim 2, wherein the first gear unit comprises:
   a first gear supportable on the rotary shaft of the motor;
   a second gear supportable on the pivot of the cleaner body; and
   a third gear supportable on the cleaner body to rotate engaging with the first gear and the second gear.

5. The robot cleaner of claim 4, wherein
   the third gear comprises a third lower gear and a third upper gear which are coaxially and integrally supportable thereon, and
   the third lower gear engages with the first gear, and the third upper gear engages with the second gear.

6. The robot cleaner of claim 3, wherein the second gear unit comprises:
   a fourth gear coaxially and integrally supportable thereon;
   a fifth gear supportable on the wheel shaft; and a sixth gear, a seventh gear and an eighth gear provided to sequentially engage between the fourth gear and the fifth gear.

7. The robot cleaner of claim 6, wherein
the seventh gear comprises a seventh lower gear and a seventh upper gear which are coaxially and integrally supportable thereon, and
the eighth gear comprises an eighth lower gear and an eighth upper gear which are coaxially and integrally supportable thereon.

8. The robot cleaner of claim 7, wherein
the sixth gear engages with both the fourth gear and the seventh lower gear,
the seventh upper gear engages with the eighth lower gear, and
the eighth upper gear engages with the fifth gear.

9. The robot cleaner of claim 1, wherein the suspension comprises a tension spring comprising opposite ends that are supportable on the suspension and the cleaner body, and elastically stretched and compressed as the pivot turns.

10. The robot cleaner of claim 9, wherein
the suspension comprises a first hook supporter provided in the first end portion thereof and is configured to hook a first end of the tension spring, and
the cleaner body comprises a second hook supporter configured to hook a second end of the tension spring.

11. The robot cleaner of claim 10, wherein
the cleaner body comprises a suspension case to accommodate and cover the suspension,
the first hook supporter is configured to pass through and protrude from a first side of the suspension case, and
the second hook supporter is supportable on a second side of the suspension case.

12. The robot cleaner of claim 10, further comprising:
a lift detector provided within a turning radius of the first hook supporter corresponding to pivoting of the suspension, and configured to detect a lift of the wheel with respect to the cleaner body.

13. The robot cleaner of claim 12, wherein the lift detector comprises:
an actuator to support a magnet and be supportable to turn by the turning of the first hook supporter; and
a magnet sensor provided in the cleaner body within a turning path of the actuator.

14. The robot cleaner of claim 1, wherein the cleaner body has a center of gravity at a front side thereof with respect to a center of the wheel.

* * * * *

UNITED STATES PATENT AND TRADEMARK OFFICE
CERTIFICATE OF CORRECTION

| | | |
|---|---|---|
| PATENT NO. | : 12,426,751 B2 | Page 1 of 1 |
| APPLICATION NO. | : 18/134786 | |
| DATED | : September 30, 2025 | |
| INVENTOR(S) | : Seungil Han et al. | |

It is certified that error appears in the above-identified patent and that said Letters Patent is hereby corrected as shown below:

In the Specification

Column 1, Line 10, Delete "Applications" and insert -- Application --.

In the Claims

Column 12, Line 64, In Claim 6, delete "claim 3," and insert -- claim 2, --.

Signed and Sealed this
Twenty-third Day of December, 2025

John A. Squires
*Director of the United States Patent and Trademark Office*